United States Patent
Sorond et al.

(10) Patent No.: US 10,263,756 B2
(45) Date of Patent: *Apr. 16, 2019

(54) ASYMMETRIC TDD IN FLEXIBLE USE SPECTRUM

(71) Applicant: DISH NETWORK CORPORATION, Englewood, CO (US)

(72) Inventors: Mariam Sorond, Reston, VA (US); Peter Corea, Alexandria, VA (US); Doug Hyslop, Vienna, VA (US); Tom Peters, McLean, VA (US)

(73) Assignee: DISH Network Corporation, Englewood, CO (US)

(*) Notice: Subject to any disclaimer, the term of this patent is extended or adjusted under 35 U.S.C. 154(b) by 0 days.

This patent is subject to a terminal disclaimer.

(21) Appl. No.: 15/641,289

(22) Filed: Jul. 4, 2017

(65) Prior Publication Data

US 2017/0310453 A1 Oct. 26, 2017

Related U.S. Application Data

(60) Continuation of application No. 15/493,762, filed on Apr. 21, 2017, now Pat. No. 9,923,709, which is a
(Continued)

(51) Int. Cl.
*H04W 16/04* (2009.01)
*H04L 5/14* (2006.01)
(Continued)

(52) U.S. Cl.
CPC ............ *H04L 5/14* (2013.01); *H04B 7/2615* (2013.01); *H04J 3/22* (2013.01)

(58) Field of Classification Search
CPC ..... H04W 36/14; H04W 74/02; H04W 72/06; H04W 36/20; H04W 72/044;
(Continued)

(56) References Cited

U.S. PATENT DOCUMENTS

| 5,452,471 A | 9/1995 | Leopold et al. |
| 5,584,046 A | 12/1996 | Martinez et al. |

(Continued)

FOREIGN PATENT DOCUMENTS

| EP | 229020 A1 | 9/2010 |
| JP | 2001267989 A1 | 9/2001 |

(Continued)

OTHER PUBLICATIONS

Chinese Patent Application Serial No. CN201410l6359, Third Office Action, dated Sep. 4, 2017, 4 pages (Chinese).
(Continued)

*Primary Examiner* — Sai Aung
(74) *Attorney, Agent, or Firm* — Wash Park IP Ltd.; John T. Kennedy

(57) ABSTRACT

A method according to an embodiment of the invention includes receiving and transmitting signals over a time division duplex (TDD) communication path. Signals are sent over the TDD communication path via a first portion and are received via a second portion of a first frequency band, wherein the first portion uses a smaller spectrum bandwidth than the second portion. The first frequency band is adjacent to a second frequency band and to a third frequency band. The second frequency band includes a first temporally-asymmetric TDD communication path having a third portion and a fourth portion. The third frequency band includes a second temporally-asymmetric TDD communication path having a fifth portion and a sixth portion.

18 Claims, 16 Drawing Sheets

Related U.S. Application Data continuation of application No. 15/130,563, filed on Apr. 15, 2016, now Pat. No. 9,722,762, which is a division of application No. 14/028,179, filed on Sep. 16, 2013, now Pat. No. 9,497,015, which is a continuation of application No. 13/105,279, filed on May 11, 2011, now Pat. No. 8,537,732, which is a division of application No. 12/270,946, filed on Nov. 14, 2008, now Pat. No. 7,969,923.

(51) Int. Cl.
*H04B 7/26* (2006.01)
*H04J 3/22* (2006.01)

(58) Field of Classification Search
CPC . H04W 72/0453; H04W 76/10; H04W 16/04; H04W 16/06; H04W 16/14
See application file for complete search history.

(56) References Cited

U.S. PATENT DOCUMENTS

| | | | |
|---|---|---|---|
| 5,884,181 | A | 3/1999 | Arnold et al. |
| 6,052,586 | A | 4/2000 | Karabinis |
| 6,208,834 | B1 | 3/2001 | Tawil et al. |
| 6,314,269 | B1 | 11/2001 | Hart et al. |
| 6,333,920 | B1 | 12/2001 | Nguyen |
| 6,353,598 | B1 | 3/2002 | Baden et al. |
| 6,463,279 | B1 | 10/2002 | Sherman et al. |
| 6,711,474 | B1 | 3/2004 | Treyz et al. |
| 6,714,760 | B2 | 3/2004 | Robinett |
| 6,791,952 | B2 | 9/2004 | Lin et al. |
| 6,839,333 | B1* | 1/2005 | Åkerberg ............ H04W 56/003 370/322 |
| 6,999,720 | B2 | 2/2006 | Karabinis |
| 7,016,316 | B2 | 3/2006 | Stobart |
| 7,031,702 | B2 | 4/2006 | Karabinis et al. |
| 7,062,267 | B2 | 6/2006 | Karabinis |
| 7,092,708 | B2 | 8/2006 | Karabinis |
| 7,113,743 | B2 | 9/2006 | Karabinis |
| 7,113,778 | B2 | 9/2006 | Karabinis |
| 7,149,526 | B2 | 12/2006 | Karabinis |
| 7,181,161 | B2 | 2/2007 | Karabinis |
| 7,218,931 | B2 | 5/2007 | Karabinis |
| 7,295,807 | B2 | 11/2007 | Karabinis |
| 7,336,626 | B1 | 2/2008 | Barratt et al. |
| 7,391,751 | B2* | 6/2008 | Lee ............ H04B 7/2615 370/330 |
| 7,639,635 | B2 | 12/2009 | Anderson et al. |
| 7,706,308 | B2 | 4/2010 | Yun et al. |
| 7,969,923 | B2 | 6/2011 | Sorond et al. |
| 8,023,885 | B2 | 9/2011 | Proctor et al. |
| 8,295,266 | B2 | 10/2012 | Fjui et al. |
| 8,682,311 | B2 | 3/2014 | Mhoebbi |
| 8,842,581 | B2 | 9/2014 | Hottinen |
| 8,902,764 | B2 | 12/2014 | Imai et al. |
| 2002/0090942 | A1 | 7/2002 | Karabinis et al. |
| 2002/0173277 | A1* | 11/2002 | Takao ............ H04W 16/04 455/77 |
| 2005/0025093 | A1* | 2/2005 | Yun ............ H04W 76/10 370/328 |
| 2006/0022048 | A1 | 2/2006 | Johnson |
| 2006/0126546 | A1* | 6/2006 | Lee ............ H04B 7/2615 370/310 |
| 2006/0221872 | A1 | 10/2006 | Jones et al. |
| 2007/0054625 | A1 | 3/2007 | Beale |
| 2007/0077884 | A1 | 4/2007 | Regulinski et al. |
| 2007/0081489 | A1 | 4/2007 | Anderson et al. |
| 2007/0097887 | A1 | 5/2007 | Kim et al. |
| 2007/0121537 | A1 | 5/2007 | Mullins et al. |
| 2007/0140166 | A1 | 6/2007 | Eichinger et al. |
| 2007/0286156 | A1 | 12/2007 | Gormely et al. |
| 2008/0025236 | A1 | 1/2008 | Jones |
| 2008/0219670 | A1 | 9/2008 | Kim et al. |
| 2008/0268838 | A1 | 10/2008 | Zufall et al. |
| 2008/0291841 | A1 | 11/2008 | Joung et al. |
| 2009/0059820 | A1* | 3/2009 | Jung ............ H04L 5/0005 370/280 |
| 2009/0180406 | A1 | 7/2009 | Breuer et al. |
| 2011/0211502 | A1 | 9/2011 | Sorond et al. |
| 2012/0093042 | A1 | 4/2012 | Sorond et al. |
| 2014/0124183 | A1 | 5/2014 | Hwang et al. |

FOREIGN PATENT DOCUMENTS

| | | |
|---|---|---|
| JP | 2003319449 A | 11/2003 |
| JP | 2005328366 A1 | 11/2005 |
| WO | 0232163 A2 | 4/2002 |

OTHER PUBLICATIONS

Chinese Patent Application Serial No. CN20141016359, Response to Third Office Action, dated Nov. 15, 2017, 9 pages (English Translation).
Chinese Patent Application Serial No. CN20141016359, Response to Third Office Action, dated Nov. 15, 2017, 7 pages (Chinese).
European Patent Office Application Serial No. EP20090764120, Decision to Grant, dated Oct. 17, 2017, 75 pages.
Chinese Patent Application Serial No. CN20141016359, Third Office Action, dated Sep. 4, 2017, 3 pages (English).
U.S. Appl. No. 15/493,762, Response to Office Action, dated Nov. 22, 2017, 12 pages.
JP2015-0035359, Decision of Refusal, dated Jun. 29, 2016, 4 pages.
JP2015-0035359, Appeal, dated Oct. 21, 2016, 8 pages.
JP2015-0035359, Decision of Grant, dated Feb. 16, 2017, 3 pages.
U.S. Appl. No. 15/493,762, Office Action, dated Aug. 24, 2017, 8 pages.
U.S. Appl. No. 13/105,279, Amendment & Response, dated Jul. 8, 2013, 7 pages.
U.S. Appl. No. 14/028,179, Office Acton, dated Aug. 29, 2014, 4 pages.
U.S. Appl. No. 14/028,179, Response, dated Nov. 25, 2014, 7 pages.
U.S. Appl. No. 14/028,179, Final Rejection, dated Jan. 27, 2015, 8 pages.
U.S. Appl. No. 14/028,179, Response to Final Action, dated Mar. 20, 2015, 9 pages.
U.S. Appl. No. 14/028,179, Advisory Action, dated Apr. 3, 2015, 2 pages.
U.S. Appl. No. 14/028,179, RCE, dated Apr. 24, 2015, 7 pages.
U.S. Appl. No. 14/028,179, Advisory Action, dated May 6, 2015, 2 pages.
U.S. Appl. No. 14/028,179, RCE, dated May 27, 2015, 3 pages.
U.S. Appl. No. 14/028,179, Notice of Allowance, dated Jul. 3, 2015, 6 pages.
U.S. Appl. No. 15/130,563, Office Action, dated Jul. 29, 2016, 9 pages.
U.S. Appl. No. 15/130,563, Response, dated Oct. 31, 2016, 13 pages.
U.S. Appl. No. 15/130,563, Final Action, dated Feb. 1, 2017, 9 pages.
U.S. Appl. No. 15/130,563, Response, dated Mar. 28, 2017, 17 pages.
U.S. Appl. No. 15/130,563, Allowance, Interview, and Amendment, dated Apr. 18, 2017, 12 pages.
U.S. Appl. No. 15/130,563, Allowance, dated Jun. 28, 2017, 2 pages.
AU2016256844, Examination Report, dated Aug. 11, 2017, 3 pages.
CN20141016359, Observations, dated Feb. 28, 2017, 6 pages.
CN20141016359, Decision of Rejection, dated Jun. 13, 2017, 9 pages.
CN20141016359, Observations, dated Aug. 13, 2017, 4 pages.
Japanese Serial No. 2017-0051246, dated Apr. 26, 2018, 2 pages (English).
Japanese Serial No. 2018-085041, Divisional App., filed, Apr. 26, 2018, 66 pages (Japanese).
Japanese Serial No. 2018-085041, Filing Receipt, dated Apr. 26, 2018, 1 page (English).

(56) References Cited

OTHER PUBLICATIONS

Japanese Serial No. 2018-085041, Request for Examination, dated May 28, 2018, 1 page (English).
Japanese Serial No. 2018-085041, Divisional App. claims as filed, 4 pages (English).
Japanese Serial No. 2017-0051246, Decision to Grant, dated Mar. 30, 2017, 2 pages, (Machine Translation).
Japanese Serial No. 2017-0051246, Claims as filed, Mar. 17, 2017, 5 pages, (English).
Japanese Serial No. 2017-0051246, Filing Receipt, dated Mar. 17, 2017, 2 pages (English).
EP097641204 AuxRqstA dated May 17, 2017, 4 pages.
EP097641204 AuxRqstB dated May 17, 2017, 4 pages.
EP097641204 AuxRqstC dated May 17, 2017, 4 pages.
EP097641204 AuxRqstD dated May 17, 2017, 4 pages.
EP097641204 AuxRqstE dated Jun. 13, 2017, 4 pages.
EP097641204 Letter dated May 17, 2017, 1 page.
EP097641204 MainRqst dated May 17, 2017, 4 pages.
EP097641204 NewDescrpPages dated May 17, 2017, 4 pages.
EP097641204 Letter dated Jun. 13, 2017, 1 page.
EP097641204 Submission dated May 17, 2017, 11 pages.
EP097641204, Minutes of Oral Proceedings, dated Jul. 6, 2017, 18 pages.
EP097641204, Reply to Minutes, dated Aug. 2, 2017, 40 pages.
JP20110535622, (English Translation by JIPO), Written Statement, dated Jun. 26, 2012, 4 pages.
JP20110535622, (English Translation by JIPO), Written Amendment, dated Mar. 26, 2013, 5 pages.
JP20110535622, (English Translation by JIPO), Notification of reasons for refusal, dated Apr. 12, 2013, English, 2 pages.
JP20110535622, (English Translation by JIPO), Written Amendment and Argument, dated Jun. 27, 2013, 4 pages.
JP20110535622, (English Translation by JIPO), Decision of refusal, dated Nov. 28, 2013, 2 pages.
JP20110535622, (English Translation by JIPO), Written Amendment, dated Mar. 26, 2014, 5 pages.
JP20110535622, (English Translation by JIPO), Written Amendment (Formality), dated Apr. 2, 2014, 2 pages.
JP20110535622, (English Translation by JIPO), Decision to Grant, dated Jun. 27, 2014, 3 pages.
U.S. Appl. No. 15/493,762, Notice of Allowance, dated Feb. 5, 2018, 8 pages.
U.S. Appl. No. 15/493,762, Issue Notification, dated Mar. 1, 2018, 1 page.
Chinese Patent Application CN201410106359, Notice of Allowance, dated Jan. 25, 2018, 2 pages, Chinese.
European Patent Application EP20090764120, Decision to Grant, dated Mar. 8, 2018, 2 pages.
Australian Patent Application No. 2016256844, Response to Examination Report, dated Jul. 27, 2018, 8 pages.
Australian Patent Application No. 2016256844, Notice of Allowance, dated Aug. 8, 2018, 3 pages.
Australian Patent Application No. 2016256844, Granted Patent, dated Nov. 29, 2018, 1 page.
European Application No. EP18163866.9, Search Report dated Jul. 5, 2018, 11 pages.
European Application No. EP18201145.2 filed on Oct. 18, 2018, claims as filed, 4 pages.
European Application No. EP18201472.0 filed on Oct. 19, 2018, claims as filed, 4 pages.
European Application No. EP18163866.9, Response to ESSR, dated Feb. 13, 2019.
Japanese Application Serial No. 2018-085041, Notice of Reasons for Rejection, dated Jan. 7, 2019, English translation.
Japanese Application Serial No. 2018-085041, Amendment, dated Feb. 25, 2019, English translation.

\* cited by examiner

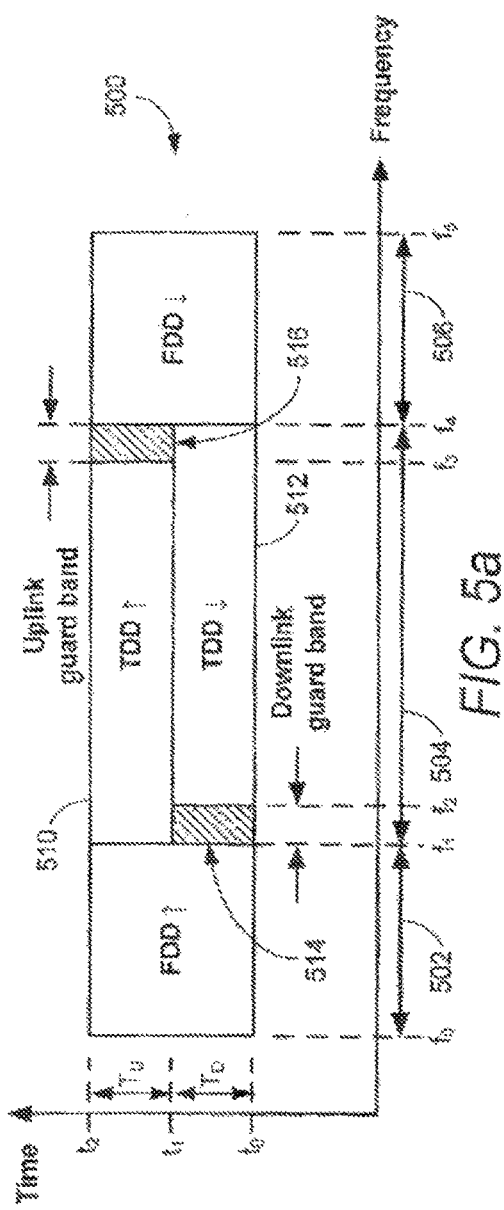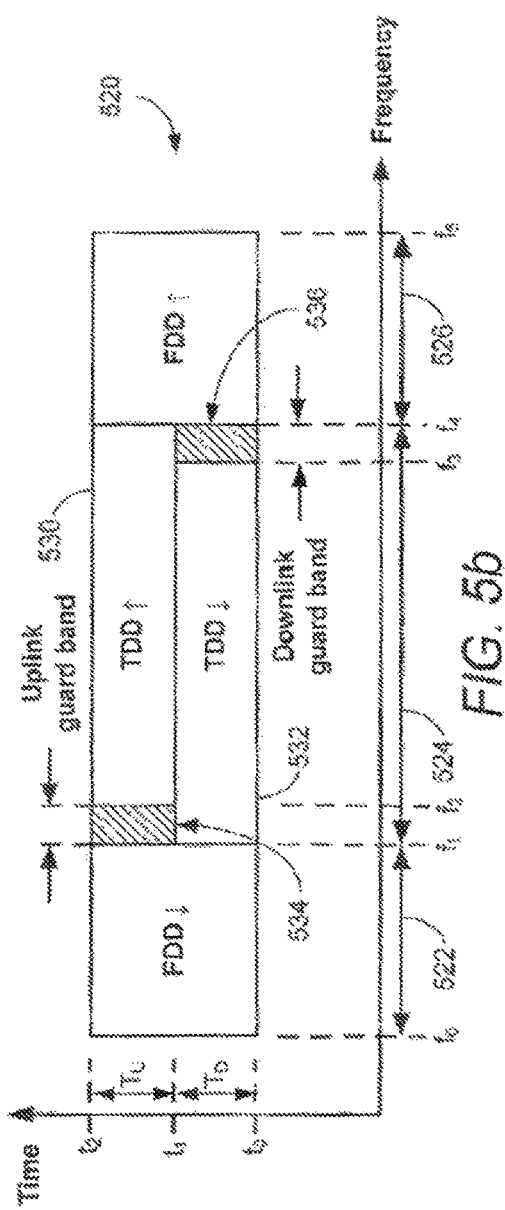

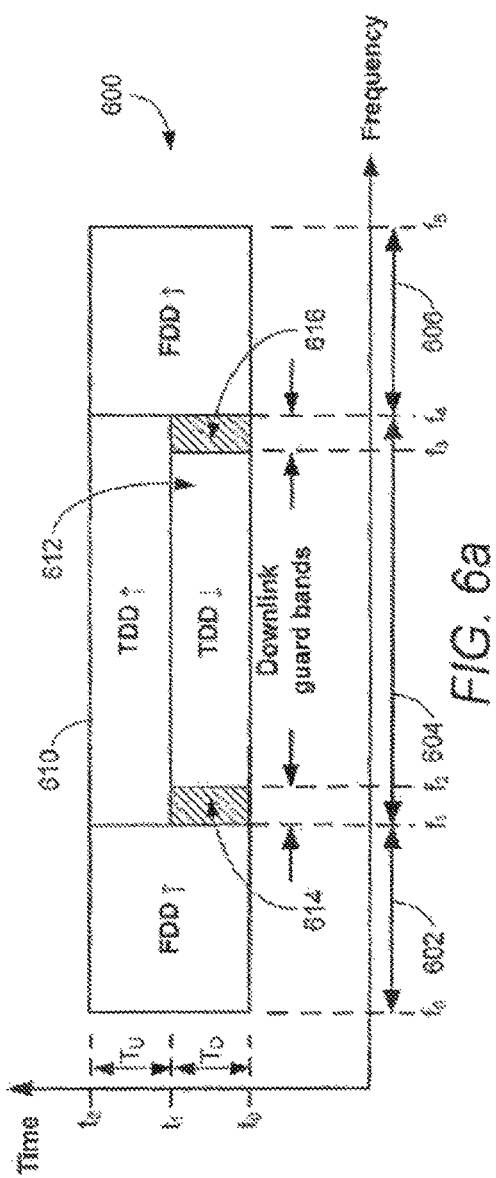
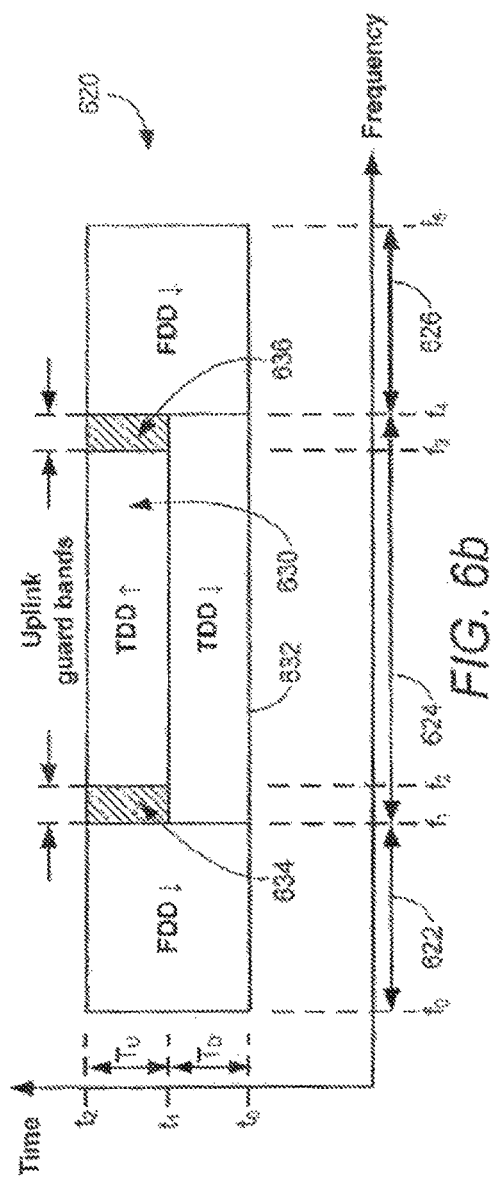

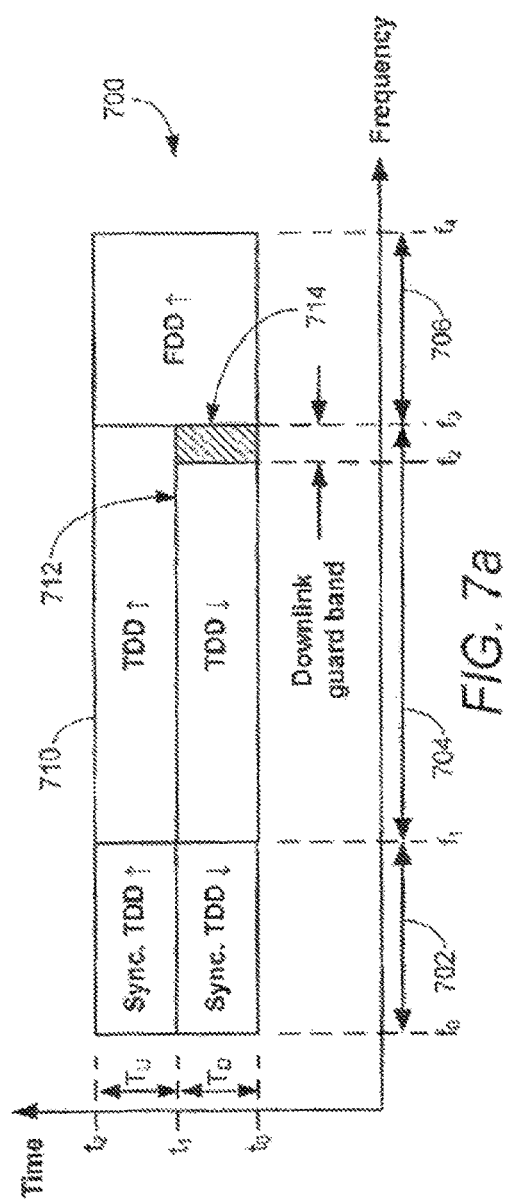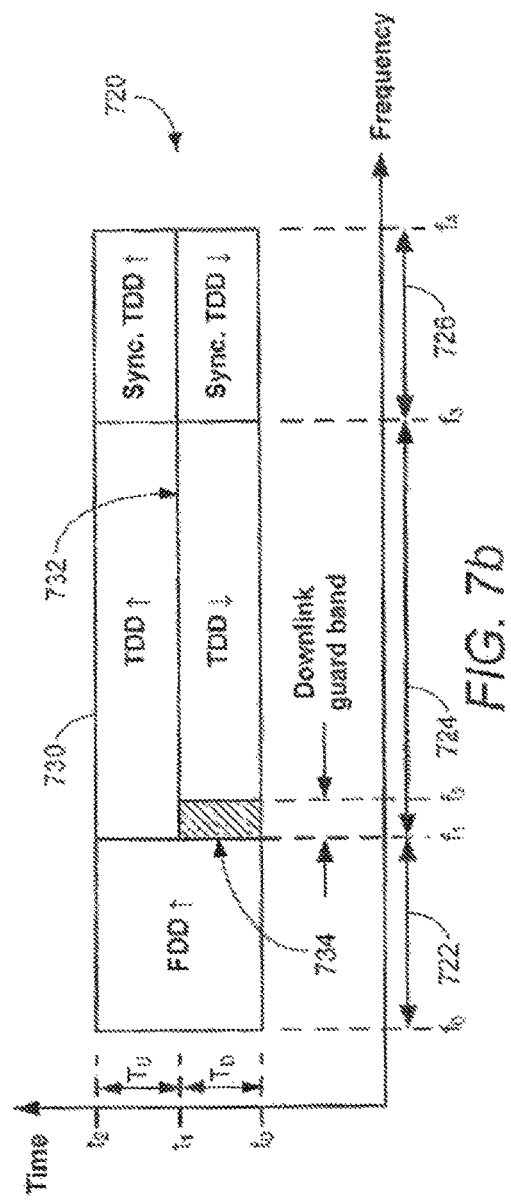
FIG. 7a
FIG. 7b

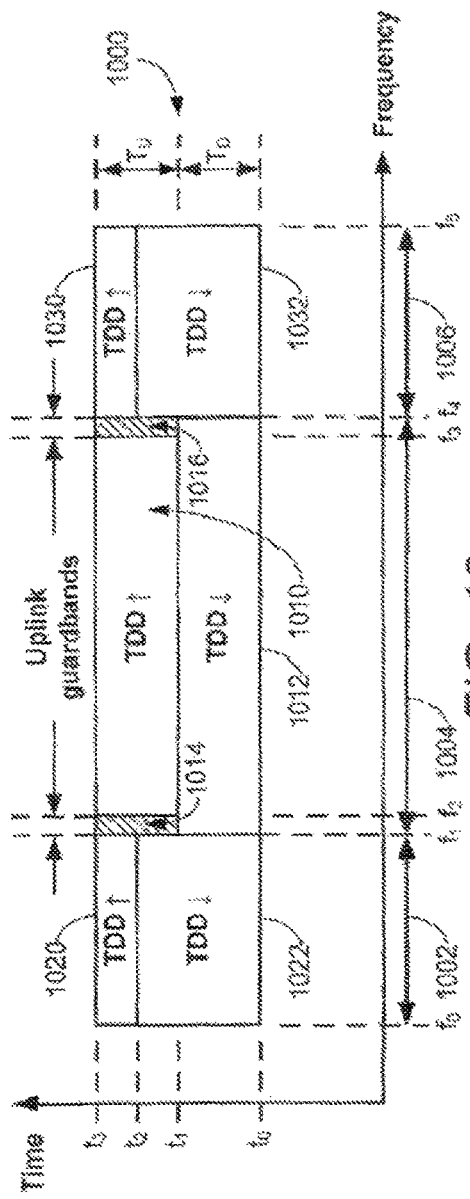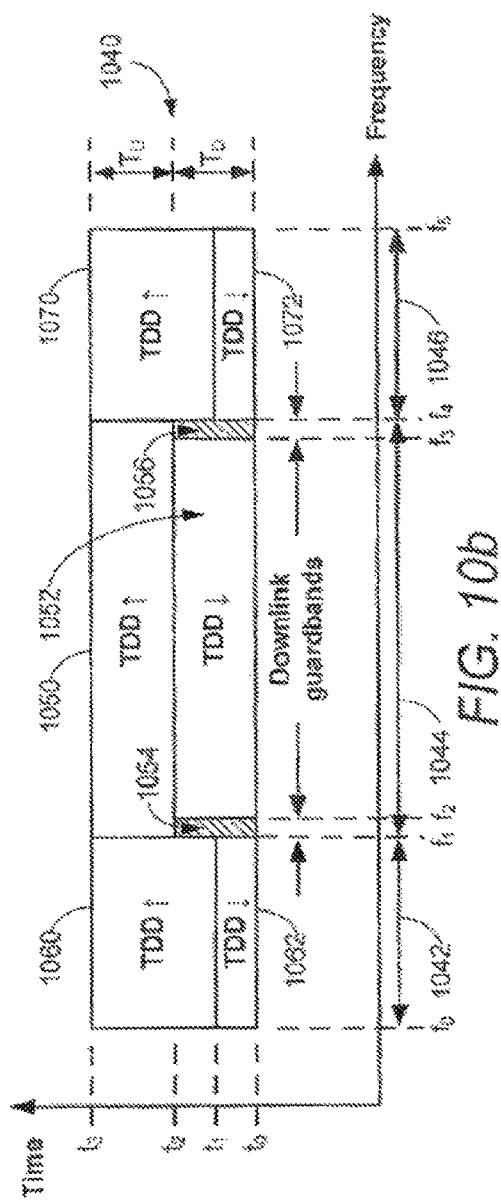

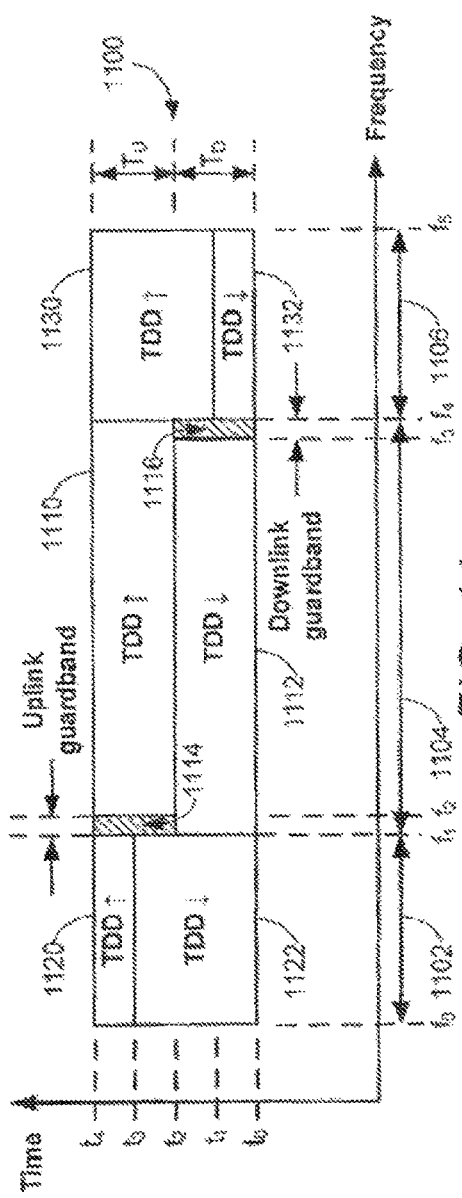
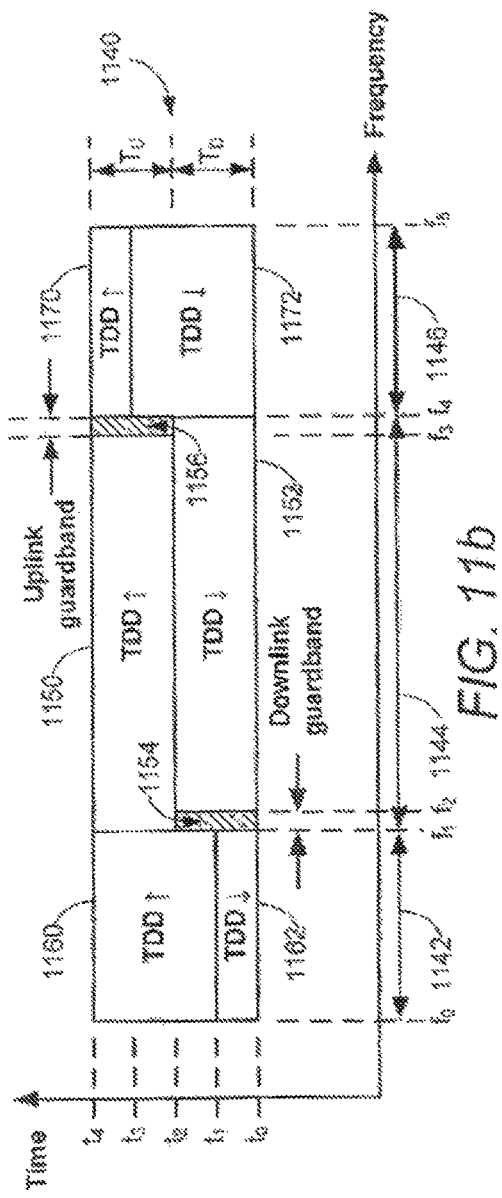
FIG. 11a
FIG. 11b

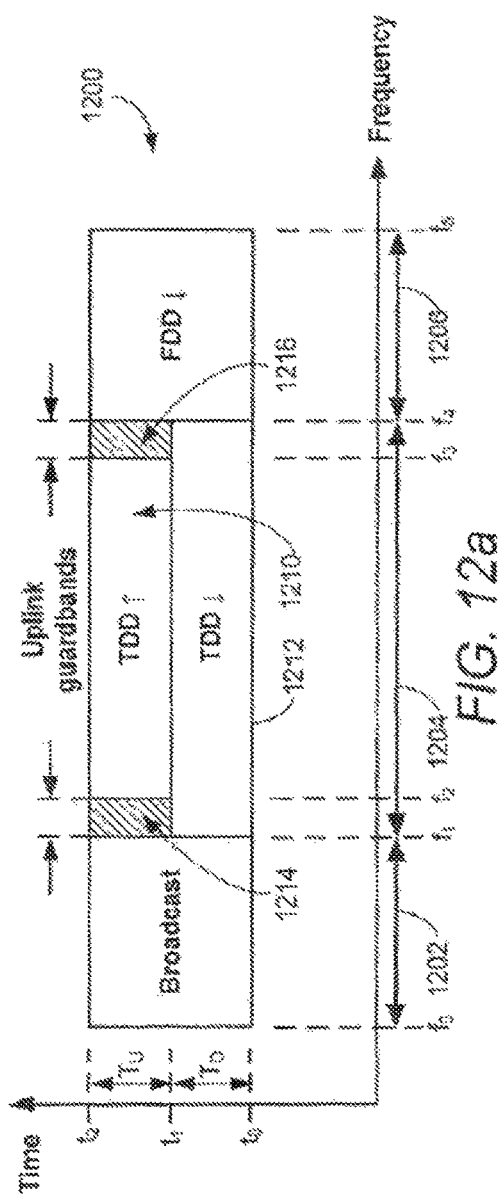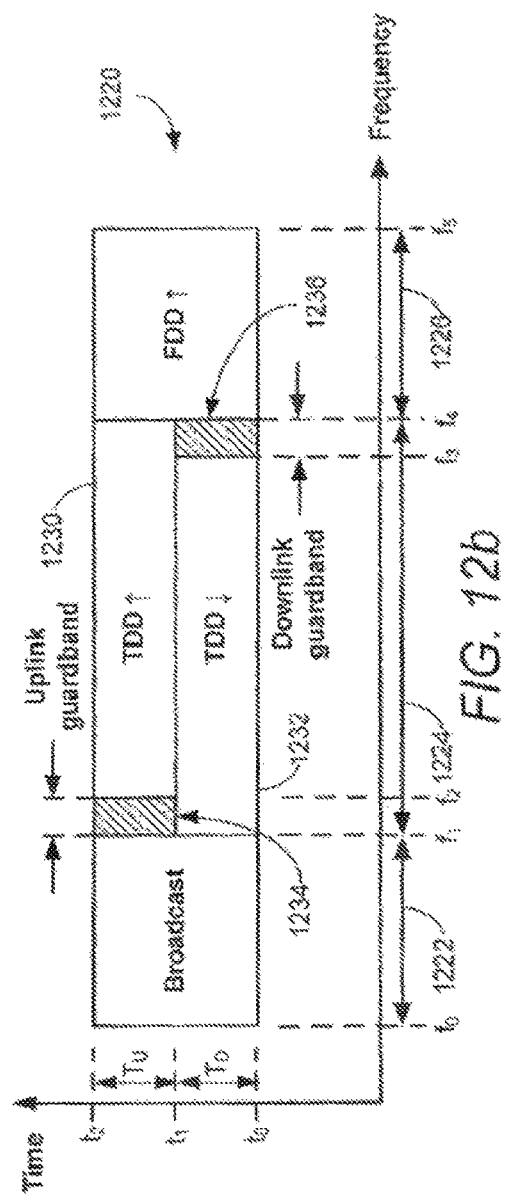

ASYMMETRIC TDD IN FLEXIBLE USE SPECTRUM

CROSS-REFERENCE TO RELATED APPLICATION

This application is a continuation of U.S. application Ser. No. 15/493,762, filed Apr. 21, 2017, and entitled "Asymmetric TDD in Flexible Use Spectrum", which is a continuation of and allowed U.S. application Ser. No. 15/130,563, filed Apr. 15, 2016, and entitled "Asymmetric TDD in Flexible Use Spectrum", which is a divisional of U.S. application Ser. No. 14/028,179, filed Sep. 16, 2013, and entitled "Asymmetric TDD in Flexible Use Spectrum", now U.S. Pat. No. 9,497,015, which is a continuation of U.S. application Ser. No. 13/105,279, filed May 11, 2011, and entitled "Asymmetric TDD in Flexible Use Spectrum", now U.S. Pat. No. 8,537,732, which is a divisional of U.S. patent application Ser. No. 12/270,946, filed Nov. 14, 2008, and entitled "Asymmetric TDD in Flexible Use Spectrum", now U.S. Pat. No. 7,969,923, all of which are incorporated in their entireties by reference as though fully disclosed herein.

BACKGROUND

The invention relates generally to wireless communication systems and more particularly to a communication method that uses time division duplexing.

In addition to traditional voice services, next generation wireless communication systems have to support various different types of multimedia services, including broadcasts, video conferencing, and interactive applications, for example. Many of these multimedia services may require flexibility in their use of spectrum capacity to operate effectively. The typical spectrum management approach is to assign frequencies to a particular use. This approach, however, has become somewhat limited in view of the complexity and overlap between the operations of next generation services and applications. One regulatory solution has been the introduction of flexible-use spectrum in which users of assigned portions of spectrum have more freedom to decide which technologies and services to deploy. In this regard, flexible-use spectrum can allow spectrum users to make timely commercial choices and can let market forces determine which competing technologies and services will be offered in a particular frequency band. Such approach can result in a more effective use of spectrum than that which occurs by imposing a technology or a service by regulation. As a result of these efforts to open up the spectrum, new user-based communication techniques are being considered that address aspects that are particular to next generation services and applications. For example, communication methods that include duplexing techniques or schemes that incorporate the inherent asymmetry in data flow that is characteristic of many multimedia services are being considered for next generation wireless communication systems.

Duplexing techniques include time division duplexing (TDD), frequency division duplexing (FDD), and/or hybrid duplexing, the latter of which includes aspects of both TDD and FDD schemes. In TDD, bidirectional communication or data flow is implemented through a communication link by separating the communication time within a given frequency band associated with the communication link into alternating transmission time slots and reception time slots. A time guard is used between time slots to reduce or minimize the likelihood of interference. In this scheme, a satellite or a base station, for example, can allocate a number of transmission time slots different from a number of reception time slots to a mobile device within a given time interval to produce asymmetric data communication. As the area of coverage provided by the satellite or the base station increases significantly, the guard time between time slots may be increased to compensate for delays that result from a longer signal round-trip between the satellite or base station and the mobile device. The increased delay can reduce the communication efficiency of the TDD scheme. In many instances, however, the time guard is sufficiently small even when large areas of coverage are concerned such that the TDD scheme efficiency remains adequate for many services or applications.

In FDD, bidirectional communication or data flow is implemented through a communication link by partitioning a given frequency band associated with the communication link into separate transmission and reception frequency bands that operate concurrently. Because the transmission and reception bands are separate from each other to reduce the likelihood of interference, no time delays occur associated with the transmission or reception of signals (i.e., no round-trip delays). Although the FDD scheme may be suitable for large areas of coverage because time delays do not play a significant role, the fixed and balanced nature of the transmission and reception frequency bands limit the flexibility that is necessary for asymmetric data communication in next generation wireless communication services. Some FDD schemes achieve asymmetry by using an auxiliary frequency band separate from the paired transmission and reception frequency bands to provide additional capacity in one direction of the data flow. This approach, however, requires the communication system to include additional hardware and/or software to handle the separate frequency band through which asymmetry is achieved.

Thus, a need exists for new methods for asymmetric communication in wireless communication systems.

SUMMARY

One or more embodiments of a method include receiving and transmitting signals over a time division duplex (TDD) communication path. Signals are received over the TDD communication path via a first portion of a first frequency band. The first frequency band is adjacent to a second frequency band and to a third frequency band. The first frequency band is different from the second frequency band and from the third frequency band. A first frequency division duplex (FDD) communication path can be operated in the second frequency band. A second FDD communication path can be operated in the third frequency band. Signals are transmitted over the TDD communication path via a second portion of the first frequency band that is different from the first portion of the first frequency band.

BRIEF DESCRIPTION OF THE DRAWINGS

FIGS. 5A-5B are each a diagram depicting time and frequency aspects of a TDD scheme with adjacent frequency division duplexing (FDD) schemes, according to embodiments.

FIGS. 6A-6B are each a diagram depicting time and frequency aspects of a TDD scheme with adjacent FDD schemes, according to embodiments.

FIGS. 7A-7B are each a diagram depicting time and frequency aspects of a TDD scheme with adjacent FDD and synchronous TDD schemes, according to embodiments.

FIGS. 10A-10B are each a diagram depicting time and frequency aspects of a TDD scheme with adjacent temporally-asymmetric TDD schemes, according to embodiments.

FIGS. 11A-11B are each a diagram depicting time and frequency aspects of a TDD scheme with adjacent temporally-asymmetric TDD schemes, according to embodiments.

FIGS. 12A-12B are each a diagram depicting time and frequency aspects of a TDD scheme with adjacent FDD and broadcast schemes, according to embodiments.

DETAILED DESCRIPTION

The devices and methods described herein are generally related to wireless communication systems. For example, the devices and methods are suitable for use in cellular (terrestrial) communication systems, satellite communication systems, and/or hybrid satellite and terrestrial (satellite/terrestrial) communication systems, such as a Mobile Satellite Services (MSS) system with an Ancillary Terrestrial Component (ATC). An example of such a hybrid satellite/terrestrial communication system is described in U.S. patent application Ser. No. 11/797,048 to Zufall et, al., the disclosure of which is incorporated herein by reference in its entirety. An MSS MSS/ATC system can use one or more satellites to support a wide geographic coverage of mobile satellite interactive (i.e., bidirectional) services. For example, a portion of the 2 GHz spectrum allocated for MSS satellite communications can be used to provide effective service coverage to rural and remote areas. Along with the MSS network, the land-based ATC network can facilitate service penetration in urban and suburban areas through effective satellite and terrestrial frequency reuse.

In one or more embodiments, a method associated with terrestrial, satellite, and/or hybrid satellite/terrestrial wireless communication systems includes receiving and transmitting signals over an asymmetric time division duplex (TDD) communication path. Signals are received over the asymmetric TDD communication path via a first portion of a first frequency band. The first frequency band is adjacent to a second frequency band and to a third frequency band. The first frequency band is different from the second frequency band and from the third frequency band. The first frequency band, the second frequency band, and the third frequency band can be mutually exclusive. A first frequency division duplex (FDD) communication path can be operated in the second frequency band. A second FDD communication path can be operated in the third frequency band. Signals are transmitted over the TDD communication path via a second portion of the first frequency band that is different from the first portion of the first frequency band.

It is noted that, as used in this written description and the appended claims, the singular forms "a," "an" and "the" include plural referents unless the context clearly dictates otherwise. Thus, for example, the term "a frequency" is intended to mean a single frequency or a combination of frequencies. Similarly, the term "a time slot" is intended to mean, for example, a single time slot or more than one time slot.

Figure 1:
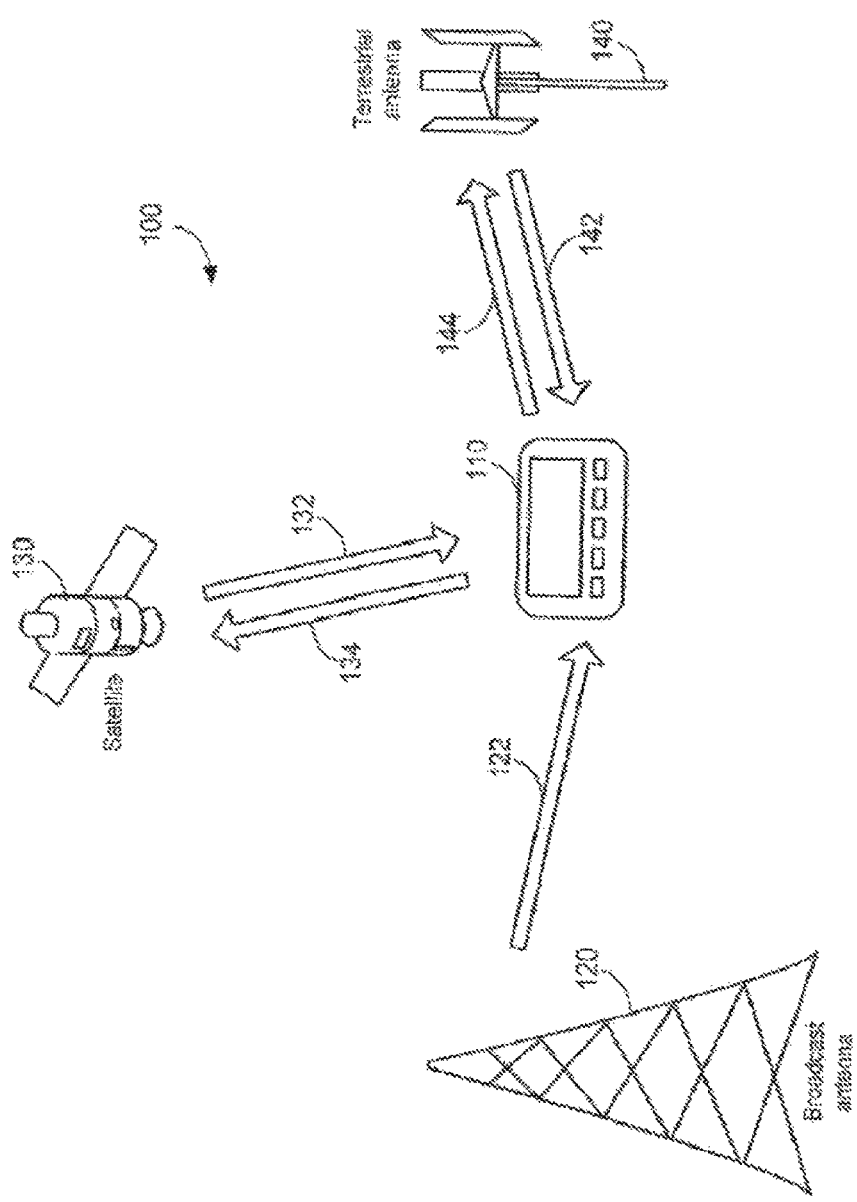
FIG. 1 is a schematic representation of a wireless communication system, according to an embodiment.

FIG. 1 is a schematic representation of a wireless communication system 100, according to an embodiment. The wireless communication system 100 is configured to provide next generation wireless communication services and applications, including interactive services, for example. The wireless communication system 100 includes a terrestrial antenna 140 and a mobile device 110. In some embodiments, the wireless communication system 100 can include at least one of a satellite 130 and a broadcast antenna 120. In some embodiments, the wireless communication system 100 can include multiple terrestrial antennas, multiple satellites, and/or multiple broadcast antennas, for example.

The terrestrial antenna 140 is configured to communicate multicast and/or interactive data with the mobile device 110 via a terrestrial communication path, channel, or link, for example, which includes a downlink portion 142 and/or an uplink portion 144. In this example, the downlink portion 142 refers to the portion of the terrestrial communication path in which data or information flows from the terrestrial antenna 140 to the mobile device 110. The terrestrial antenna 140 is thus configured to send, transmit, or transfer data to the mobile device 110 via the downlink portion 142 of the terrestrial communication path, while the mobile device 110 is configured to receive data at downlink portion 142. The uplink portion 144 refers to a portion of the terrestrial communication path in which data or information flows from the mobile device 110 to the terrestrial antenna 140. The mobile device 110 is thus configured to send, transmit, or transfer data to the terrestrial antenna 140 via the uplink portion 144 of the terrestrial communication path, while the terrestrial antenna 140 is configured to receive at uplink portion 144. The terrestrial antenna 140 can be associated with a wireless base station used, for example, in cellular or like communication systems. In some embodiments, the downlink portion 142 of the terrestrial communication path and the uplink portion 144 of the terrestrial communication path operate over the same frequency band. In other embodiments, the downlink portion 142 of the terrestrial communication path operates over a first frequency band and the uplink portion 144 of the terrestrial communication path operates over a second frequency band different from the first frequency band.

The terrestrial antenna 140 is configured to communicate with the mobile device 110 via the terrestrial communication path, for example, by using a duplexing scheme such as a TDD scheme, an FDD scheme, and/or a hybrid TDD/FDD scheme. The terrestrial antenna 140 is thus configured to establish and/or operate an asymmetric TDD communication scheme with the mobile device 110 via the terrestrial communication path. An asymmetric TDD communication scheme refers to a TDD communication path, channel, or link, for example, between the terrestrial antenna 140 and the mobile device 110 in which the amount of data flowing in one direction (uplink or downlink) is larger than the amount of data flowing in the opposite direction. For example, in interactive multimedia applications, the amount of data (e.g., video) flowing from the terrestrial antenna 140 to the mobile device 110 is larger than the amount of data (e.g., user selections) flowing from the mobile device 110 to the terrestrial antenna 140. The amount of data flowing in a given direction can be based on a spectrum bandwidth associated with that direction and/or a time interval associated with the flow of data in that direction. An asymmetric TDD communication scheme may provide the asymmetry that is desirable in many next generation services and applications without the need for an auxiliary frequency band to increase capacity in one direction or another.

The broadcast antenna 120 is configured to communicate with the mobile device 110 via a broadcast 122. In this example, data flows from the broadcast antenna 120 to the mobile device 110. In one embodiment, the broadcast antenna 120 can be a directional antenna and can be configured such that the broadcast 122 occurs in a particular direction. In another embodiment, the broadcast antenna 120 can be an omni-directional antenna and can be configured such that the broadcast 122 occurs uniformly in every direction.

The satellite 130 is configured to communicate multicast and/or interactive data with the mobile device 110 via a satellite communication path, channel, or link, for example, which includes a downlink portion 132 and/or an uplink portion 134. In this example, the downlink portion 132 refers to the portion of the satellite communication path in which data or information flows from the satellite 130 to the mobile device 110. The satellite 130 is thus configured to send, transmit, or transfer data (e.g., video content) to the mobile device 110 via the downlink portion 132 of the satellite communication path, while the mobile device 110 is configured to receive data from the satellite 130 via that downlink portion 132. The uplink portion 134 refers to a portion of the satellite communication path in which data or information flows from the mobile device 110 to the satellite 130. The mobile device 110 is thus configured to send, transmit, or transfer data (e.g., interactive data) to the satellite 130 via the uplink portion 134 of the satellite communication path, while the satellite 130 is configured to receive data from the mobile device 110 via that uplink portion 134. In some embodiments, the downlink portion 132 of the satellite communication path and the upstream portion 134 of the satellite communication path operate over the same frequency band. In other embodiments, the downlink portion 132 of the satellite communication path operates over a first frequency band and the upstream portion 134 of the satellite communication path operates over a second frequency band different from the first frequency band.

The satellite 130 is configured to communicate with the mobile device 110 via the satellite communication path, for example, by using a duplexing scheme such as a TDD scheme, an FDD scheme, and/or a hybrid TDD/FDD scheme. The satellite 130 is configured to establish and/or operate an asymmetric TDD communication scheme with the mobile device 110 via the satellite communication path. For example, in interactive travel assistance applications, the amount of data (e.g., navigation data) flowing from the satellite 130 to the mobile device 110 is larger than the amount of data (e.g., user queries) flowing from the mobile device 110 to the satellite 130. The amount of data flowing in a given direction can be based on a spectrum bandwidth associated with that direction and/or a time interval associated with that direction.

In some embodiments, the satellite 130 and the terrestrial antenna 140 can be used in a hybrid satellite/terrestrial communication system to communicate with the mobile device 110. For example, the satellite 130 can be configured to communicate with the terrestrial antenna 140 such that data can flow from the satellite 130 to the mobile device 110 via the terrestrial antenna 140. In this example, the satellite 130 can be configured to send data to the terrestrial antenna 140 via a downlink portion of a given satellite communication path (not shown) with the terrestrial antenna 140. The terrestrial antenna 140 can be configured to send the data received from the satellite 130 to the mobile device 110 via the downlink portion 142 of the terrestrial communication path. In another example, the terrestrial antenna 140 can be configured to communicate with the satellite 130 via a network (not shown) and/or a ground station (not shown).

The mobile device 110 can include a handheld device, a laptop, and/or an in-vehicle system, for example. The mobile device 110 is configured to communicate with the satellite 130 and/or the terrestrial antenna 140. For example, the mobile device 110 can be configured to communicate with the satellite 130 via an asymmetric TDD communication scheme (e.g., TDD downlink and TDD uplink) over a satellite communication path. In another example, the mobile device 110 can be configured to communicate with the terrestrial antenna 140 via an asymmetric TDD communication scheme (e.g., TDD downlink and TDD uplink) over a terrestrial communication path. The mobile device 110 can also be configured to receive broadcast data from the broadcast antenna 120. The functionality of the mobile device 110 can be software-based (e.g., set of instructions executable at a processor, software code) and/or hardware-based (e.g., circuit system, processor, application-specific integrated circuit (ASIC), field programmable gate array (FPGA)). The mobile device 110 can include a processor and a related processor-readable medium having instructions or computer code thereon for performing various processor-implemented operations. Such processors can be implemented as hardware modules such as embedded microprocessors, microprocessors as part of a computer system, Application-Specific Integrated Circuits ("ASICs"), and Programmable Logic Devices ("PLDs"). Such processors can also be implemented as one or more software modules in programming languages as Java, C++, C, assembly, a hardware description language, or any other suitable programming language.

A processor according to some embodiments of the mobile device 110 includes media and computer code (also can be referred to as code) specially designed and constructed for the specific purpose or purposes. Examples of processor-readable media include, but are not limited to: magnetic storage media such as hard disks, floppy disks, and magnetic tape; optical storage media such as Compact Disc/Digital Video Discs ("CD/DVDs"), Compact Disc-Read Only Memories ("CD-ROMs"), and holographic devices; magneto-optical storage media such as optical disks, and read-only memory ("ROM") and random-access memory ("RAM") devices. Examples of computer code include, but are not limited to, micro-code or micro-instructions, machine instructions, such as produced by a compiler, and files containing higher-level instructions that are executed by a computer using an interpreter. For example, an embodiment of the mobile device 110 may be implemented using Java, C++, or other object-oriented programming language and development tools. Additional examples of computer code include, but are not limited to, control signals, encrypted code, and compressed code.

In some embodiments, at least a portion of the wireless communication system 100 can be pre-configured to support an asymmetric TDD communication scheme. In other embodiments, at least a portion of the wireless communication system 100 can be dynamically configured (e.g., after deployment) to support an asymmetric TDD communication scheme.

Figure 2:
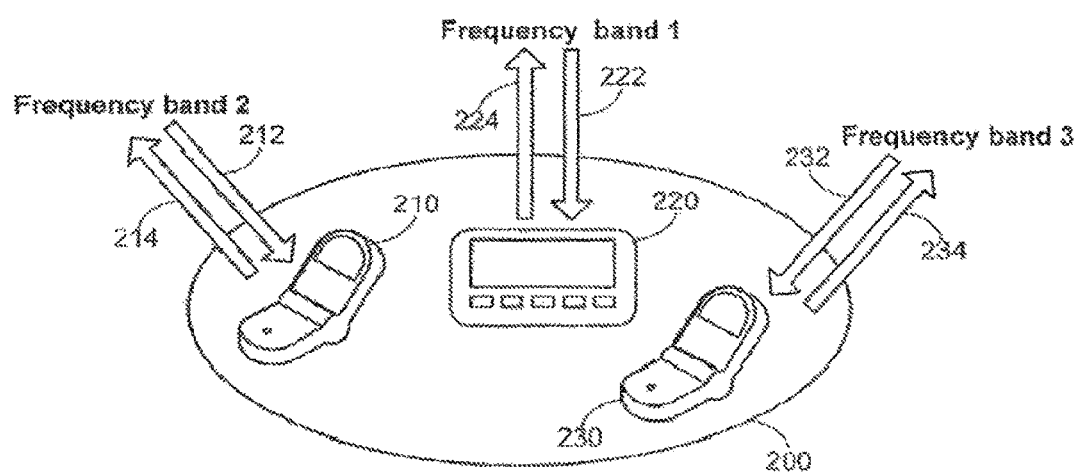
FIG. 2 is a schematic representation of coexisting mobile devices, according to embodiments.

FIG. 2 is a schematic representation showing mobile devices 210, 220, and 230 operating in an area 200, according to embodiments. The mobile device 220 is configured to communicate with a given wireless communication system (not shown), such as the wireless communication system 100 described above with respect to FIG. 1. The mobile device 220 can communicate with that wireless communication system via an asymmetric TDD communication scheme. For example, the mobile device 220 can communicate via an uplink portion 224 and a downlink portion 222 of an asymmetric TDD communication scheme associated with a particular frequency band (frequency band 1).

The mobile device 210 and the mobile device 230 are each configured to communicate with a wireless communication system (not shown) via a communication path that includes one of multiple communication methods such as an FDD communication scheme, a TDD communication scheme synchronous with the asymmetric TDD communication scheme associated with the mobile device 220, a TDD communication scheme asynchronous with the asymmetric TDD communication scheme associated with the mobile device 220, a temporally-asymmetric TDD communication scheme, or a broadcast, for example. In some embodiments, the mobile device 210 can communicate with its associated wireless communication system via a communication path having an uplink portion 214 and a downlink portion 212. Each of the uplink portion 214 and the downlink portion 212 of the communication path is associated with a frequency band 2. Similarly, the mobile device 230 can communicate with its associated wireless communication system via a communication path having an uplink portion 234 and a downlink portion 232. Each of the uplink portion 234 and downlink portion 2232 is associated with a frequency band 3. In some embodiments, the frequency band 2 and/or the frequency band 3 can include multiple frequency bands or frequency subbands.

The frequency bands 1, 2, and 3 can be adjacent (i.e., adjoining or neighboring) frequency bands. For example, frequency band 1 can be adjacent to frequency band 2 and adjacent to frequency band 3. The frequency bands 1, 2, and 3 can be mutually exclusive frequency bands, for example. In some embodiments, the frequency band 1 can be associated with a flexible-use spectrum, for example.

The mobile devices 220 and 210 are configured to coexist in the area 200 such that minimal (if any) interference occurs between the asymmetric TDD communication scheme being used by the mobile device 220 (and associated with frequency band 1) and the communication method being used by the mobile device 210 (and associated with frequency band 2). Similarly, the mobile devices 220 and 230 are configured to coexist in the area 200 such that minimal (if any) interference occurs between the asymmetric TDD communication scheme being used by the mobile device 220 (and associated with frequency band 1) and the communication method being used by the mobile device 230 (and associated with frequency band 3). The size of the area 200 may be associated with the minimum distance between the mobile device 220 and the mobile device 210, and/or the minimum distance between the mobile device 220 and the mobile device 230 such that the mobile devices 210, 220, and/or 230 can effectively operate (i.e., coexist) without interfering with each other.

Figure 3:
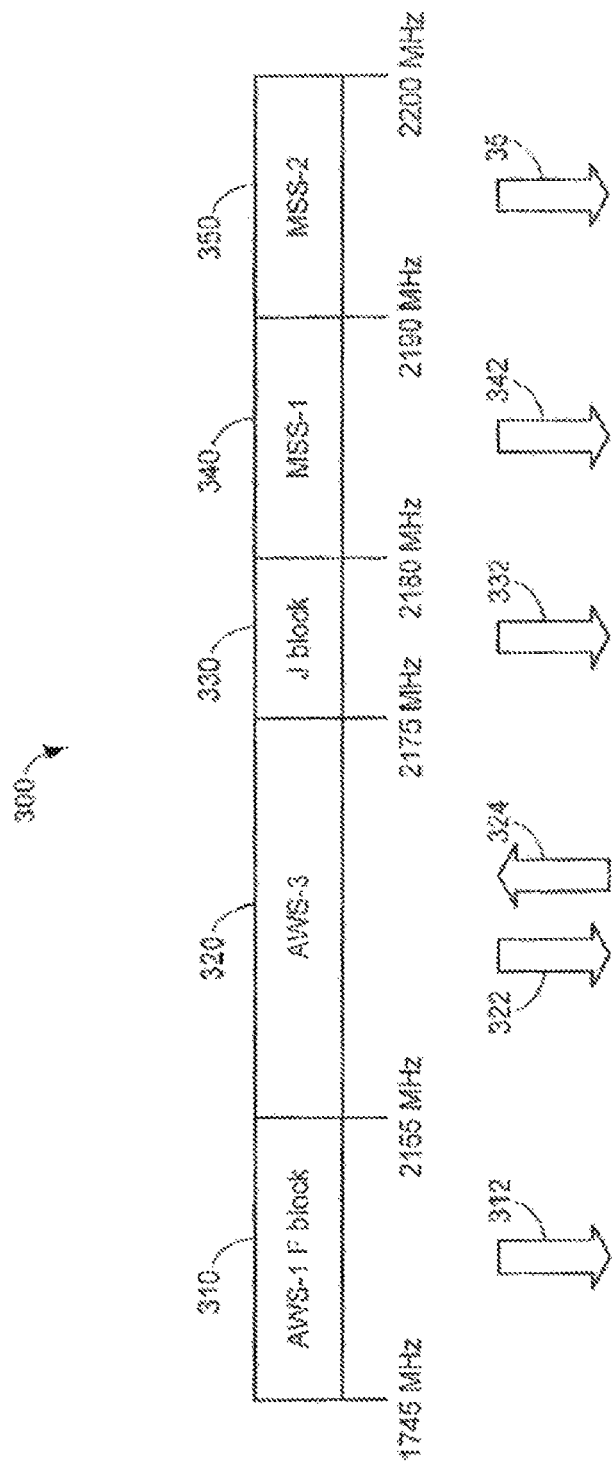
FIG. 3 is a diagram illustrating an asymmetric time division duplexing (TDD) scheme in AWS-3 flexible use spectrum, according to an embodiment.

FIG. 3 is a diagram illustrating an asymmetric TDD scheme in an advanced wireless services (AWS) spectrum, according to an embodiment. The wireless spectrum 300 is a portion of the radio frequency spectrum that includes a portion 310 (AWS-1 F Block), a portion 320 (AWS-3), a portion 330 (J Block), a portion 340 (MSS-1), and a portion 350 (MSS-2). The AWS-1 and AWS-3 are each a portion of an AWS frequency band plan associated with next generation voice and data services and applications. The AWS-1 includes multiple frequency blocks, such as blocks A, B, C, D, E, and F. Each frequency block has an associated mobile frequency band and base frequency band. The portion 310 of the wireless spectrum 300 is associated with the base frequency band of the AWS-1 F block of the AWS frequency band plan. The AWS-1 F block includes frequencies from about 1745 megahertz (MHz) to about 2155 MHz and is used for downlink communication via a downlink portion 312 of a communication path between, for example, a base station (e.g., terrestrial antenna) and a mobile device. The AWS-1 F block is shown as being adjacent to the AWS-3 portion of the AWS frequency band plan.

The J block is a frequency band being proposed for use with an AWS-2 portion (not shown) of the AWS frequency band plan. The J block includes frequencies from about 2175 MHz to about 2180 MHz. The J block is shown as being adjacent to the AWS-3 portion of the AWS frequency band plan and adjacent to the MSS-1 portion of the wireless spectrum 300. The J block is used for downlink communication via a downlink portion 332 of a communication path between, for example, a terrestrial antenna and a mobile device.

Each of the MSS-1 and MSS-2 is a portion of the wireless spectrum 300 that is used for mobile satellite services systems. The MSS-1 portion of the wireless spectrum 300 is associated with a frequency band that includes frequencies from about 2180 MHz to about 2190 MHz. The MSS-2 portion of the wireless spectrum 300 is associated with a frequency band that includes frequencies from about 2190 MHz to about 2200 MHz. Each of the MSS-1 and MSS-2 portions of the wireless spectrum 300 can be used in hybrid satellite/terrestrial wireless communication systems, for example. The MSS-1 portion of the wireless spectrum 300 is used for downlink communication via a downlink portion 342 of a communication path between, for example, a base station or a satellite, and a mobile device. The MSS-2 portion of the wireless spectrum 300 is used for downlink communication via a downlink portion 352 of a communication path between, for example, a base station or a satellite, and a mobile device. The MSS-1 portion of the wireless spectrum 300 is shown as being adjacent to the J block and adjacent to the MSS-2 portion of the wireless spectrum 300. The MSS-2 portion of the wireless spectrum 300 is shown as being adjacent to the MSS-1 portion of the wireless spectrum 300.

The AWS-3 portion of the AWS frequency band plan is being proposed for flexible-use spectrum services and applications. The AWS-3 portion of the AWS frequency band plan can be used for services and applications that use different communication methods. For example, the AWS-3 portion of the AWS frequency band plan can be used for an asymmetric TDD communication scheme via a communication path between, for example, a base station or a satellite, and a mobile device. The communication path associated with the asymmetric TDD communication scheme includes a downlink portion 322 and an uplink portion 324. Because the AWS-3 portion of the AWS frequency band plan is adjacent to the AWS-1 F block and the J block, it is desirable that the downlink portion 322 and the uplink portion 324 be configured such that minimal (if any) interference occurs between the frequency band associated with the AWS-3 portion of the AWS frequency band plan and the frequency bands associated with the AWS-1 F block and the J block.

Figure 4:
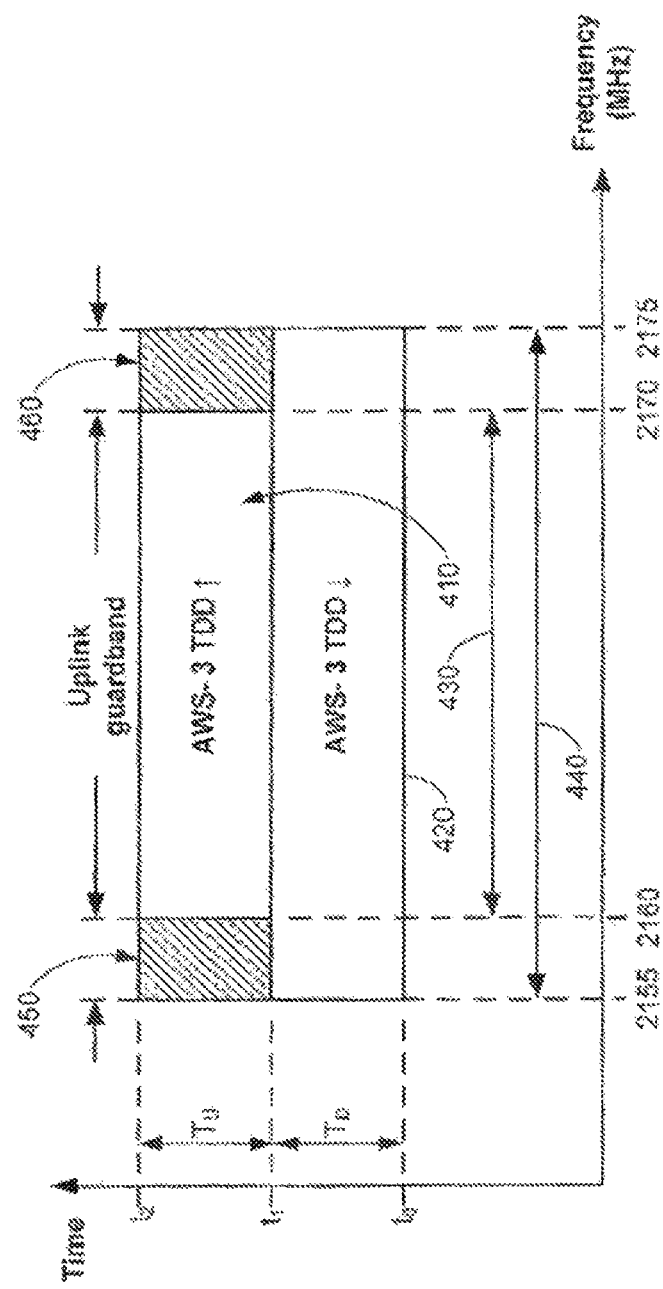
FIG. 4 is a diagram illustrating aspects of an asymmetric TDD communication scheme for use in the AWS-3 portion of the wireless spectrum, according to an embodiment.

FIG. 4 is a diagram illustrating aspects of an asymmetric TDD communication scheme for use in the AWS-3 portion of the wireless spectrum 300 described above with respect to FIG. 3, according to an embodiment. The asymmetric TDD communication scheme allocates or assigns frequencies from about 2160 MHz to about 2170 MHz to a first portion 410 of a frequency band 440 and associated with a frequency band 430. The asymmetric TDD communication scheme also allocates or assigns frequencies from about 2155 MHz to about 2175 MHz to a second portion 420 associated with the frequency band 440. The first portion 410 is different from the second portion 420 of the asymmetric TDD communication scheme. For example, a spectrum bandwidth associated with the frequency band 440 of the second portion 420 is larger than a spectrum bandwidth associated with the frequency band 420 of the first portion 410.

The first portion 410 is associated with an uplink portion or uplink communication portion (↑) of the asymmetric TDD communication scheme. The first portion 410 has an uplink time interval or uplink time slot, $T_U$, associated with the interval between time instances $t_1$ and $t_2$. The second portion 420 is associated with a downlink portion or downlink communication portion (↓) of the asymmetric TDD communication scheme. The second portion 420 has a downlink time interval or downlink time slot, $T_D$, associated with the interval between time instances $t_0$ and $t_1$. In some embodiments, the interval between time instances $t_1$ and $t_2$ can have substantially the same duration as the interval between time instances $t_0$ and $t_1$. In other embodiments, the interval between time instances $t_1$ and $t_2$ can have a different duration than the duration of the interval between time instances $t_0$ and $t_1$.

Asymmetric data flow in the TDD communication scheme occurs when a time-bandwidth product associated with the first portion 410 is different from a time-bandwidth product associated with the second portion 420. The time-bandwidth product associated with the first portion 410 refers to the product of $T_U$ and the spectrum bandwidth associated with the frequency band 430. The time-bandwidth product associated with the first portion 410 is proportional to the amount of data that can flow in the direction of the first portion 410. The time-bandwidth product associated with the second portion 420 refers to the product of $T_D$ and the spectrum bandwidth associated with the frequency band 440. The time-bandwidth product associated with the second portion 420 is proportional to the amount of data that can flow in the direction of the second portion 420. When $T_U$ and $T_D$ are substantially the same, the amount of data flow in a given direction is proportional to the spectrum bandwidth of the frequency band associated with that direction. In this example, when $T_U$ and $T_D$ are substantially the same, the amount of data flow is larger in the downlink direction associated with the second portion 420 of the asymmetric TDD communication scheme than in the uplink direction associated with the first portion 410 of the asymmetric TDD communication scheme.

The asymmetric TDD communication scheme also includes an uplink guard band 450 that separates the first portion 410 from a frequency band (e.g., AWS-1 F block) that is adjacent to the 2155 MHz frequency of the frequency band 440. The asymmetric TDD communication scheme further includes an uplink guard band 460 that separates the first portion 410 from a frequency band (e.g., J block) that is adjacent to the 2175 MHz frequency of the frequency band 440. The uplink guard bands 450 and 460 are used to minimize or reduce the interference that can occur between the downlink portions of the adjacent frequency bands and the uplink portion of the asymmetric TDD communication scheme described in FIG. 4.

FIGS. 5A-5B are each a diagram depicting the time and frequency aspects of a TDD scheme with adjacent FDD schemes, according to embodiments. FIG. 5A shows a diagram 500 that illustrates a first frequency band 504 associated with a TDD communication path. The TDD communication path can be symmetric or asymmetric. In some embodiments, it may be desirable that the TDD communication path be asymmetric to be used in next generation applications and services. The diagram 500 also illustrates a second frequency band 502 associated with an uplink portion of an FDD communication path and a third frequency band 506 associated with a downlink portion of an FDD communication path. The second frequency band 502 and the third frequency band 506 need not (but can) be paired FDD frequency bands associated with the same FDD communication path.

The first frequency band 504 is associated with a spectrum bandwidth that includes frequencies in the range $f_1$ to $f_4$. The second frequency band 502 is associated with a spectrum bandwidth that includes frequencies in the range $f_0$ to $f_1$. The third frequency bandwidth 506 is associated with a spectrum bandwidth that includes frequencies in the range $f_4$ to $f_5$. The first frequency band 504 is adjacent to the second frequency band 502 (e.g., at $f_1$). The first frequency band 504 is adjacent to the third frequency band 506 (e.g., at $f_4$). The first frequency band 504, the second frequency band 502, and the third frequency band 506 can be mutually exclusive frequency bands. In some embodiments, the first frequency band 504, the second frequency band 502, and the third frequency band 506 are wireless frequency bands.

The first frequency band 504 includes a first portion 510 that has allocated or assigned a spectrum bandwidth including frequencies in the range $f_1$ to $f_3$. The first frequency band 504 includes a second portion 512 that has allocated or assigned a spectrum bandwidth including frequencies in the range $f_2$ to $f_4$. The first portion 510 of the first frequency band 504 is different from the second portion 512 of the first frequency band 504 and overlaps the second portion 512 of the first frequency band 504. The spectrum bandwidth associated with the first portion 510 of the first frequency band 504 can be different (or the same) from the spectrum bandwidth associated with the second portion 512 of the first frequency band 504.

The first portion 510 of the first frequency band 504 is associated with an uplink portion or uplink communication portion of the TDD communication path. The first portion 510 has an uplink time interval or uplink time slot, $T_U$, associated with the interval between time instances $t_1$ and $t_2$. The second portion 512 of the first frequency band 504 is associated with a downlink portion or downlink communication portion of the TDD communication path. The second portion 512 has a downlink time interval or downlink time slot, $T_D$, associated with the interval between time instances $t_0$ and $t_1$.

When the time-bandwidth product associated with the first portion 510 of the first frequency band 504 is substantially the same as the time-bandwidth product associated with the second portion 512 of the first frequency band 504, the TDD communication path associated with the first frequency band 504 operates as a symmetric TDD communication path. The time-bandwidth product associated with the first portion 510 of the first frequency band 504 refers to the product of $T_U$ and the spectrum bandwidth between frequencies $f_1$ and $f_3$. The time-bandwidth product associated with the second portion 512 of the first frequency band 504 refers to the product of $T_D$ and the spectrum bandwidth between frequencies $f_2$ and $f_4$. When the time-bandwidth product associated with the first portion 510 of the first frequency band 504 is different from the time-bandwidth product associated with the second portion 512 of the first frequency band 504, the TDD communication path associated with the first frequency band 504 operates as an asymmetric TDD communication path.

FIG. 5A shows the first portion 510 of the first frequency band 504 as being adjacent to the second frequency band 502 and separate from the third frequency band 506 by an uplink guard band 516. Because the first portion 510 of the first frequency band 504 and the uplink portion of the FDD communication path associated with the second frequency band 502 are both either transmitting or receiving signals in a same direction, no guard band may be desirable between the first portion 510 of the first frequency band 504 and the second frequency band 502 given that minimal (if any) interference occurs. On the other hand, the first portion 510 of the first frequency band 504 and the downlink portion of the FDD communication link associated with the third frequency band 506 may need a guard band (e.g., uplink guard band 516) because they are either transmitting or receiving signals in opposite directions, which may result in significant levels of interference.

Similarly, the second portion 512 of the first frequency band 504 is shown as being adjacent to the third frequency band 506 and separate from the second frequency band 502 by a downlink guard band 514. Because the second portion 512 of the first frequency band 504 and the downlink portion of the FDD communication path associated with the third frequency band 506 are both either transmitting or receiving signals in a same direction, no guard band may be desirable given that minimal (if any) interference occurs between the second portion 512 of the first frequency band 504 and the third frequency band 506. On the other hand, the second portion 512 of the first frequency band 504 and the uplink portion of the FDD communication path associated with the second frequency band 502 may need a guard band (e.g., downlink guard band 514) because they are either transmitting or receiving signals in opposite directions, which may result in significant levels of interference. The uplink guard band 516 and the downlink guard band 514 need not (but can) have the same spectrum bandwidth.

FIG. 5B shows a diagram 520 that illustrates a first frequency band 524 associated with a TDD communication path. The diagram 520 also illustrates a second frequency band 522 associated with a downlink portion of an FDD communication path and a third frequency band 526 associated with an uplink portion of an FDD communication path. The second frequency band 522 and the third frequency band 526 need not (but can) be paired FDD frequency bands associated with the same FDD communication path.

The first frequency band 524, the second frequency band 522, and the third frequency band 526 are similar to the first frequency band 504, the second frequency band 502, and the third frequency band 506 described above with respect to FIG. 5A. The first frequency band 524 includes a first portion 530 that has allocated or assigned a spectrum bandwidth including frequencies in the range $f_2$ to $f_4$. The first frequency band 524 includes a second portion 532 that has allocated or assigned a spectrum bandwidth including frequencies in the range $f_1$ to $f_3$. The first portion 530 of the first frequency band 524 is different from the second portion 532 of the first frequency band 524 and overlaps the second portion 532 of the first frequency band 524. The spectrum bandwidth associated with the first portion 530 of the first frequency band 524 can be different (or the same) from the spectrum bandwidth associated with the second portion 532 of the first frequency band 524.

The first portion 530 of the first frequency band 524 is associated with an uplink portion of the TDD communication path and has an associated uplink time slot, $T_U$, described above with respect to FIG. 5A. The second portion 532 of the first frequency band 524 is associated with a downlink portion of the TDD communication path and has an associated downlink time slot, $T_D$, also described above with respect to FIG. 5A. The TDD communication path associated with the first frequency 524 can be symmetric or asymmetric based on the time-bandwidth product associated with the first portion 530 of the first frequency band 524 and the time-bandwidth product associated with the second portion 532 of the first frequency band 524.

FIG. 5B shows the first portion 530 of the first frequency band 524 as being adjacent to the third frequency band 526 and separate from the second frequency band 524 by an uplink guard band 534. The first portion 530 of the first frequency band 524 and the downlink portion of the FDD communication path associated with the second frequency band 524 may need a guard band because they are either transmitting or receiving signals in opposite directions, which may result in significant levels of interference.

Similarly, the second portion 532 of the first frequency band 524 is shown as being adjacent to the second frequency band 522 and separate from the third frequency band 526 by a downlink guard band 536. The second portion 532 of the first frequency band 524 and the uplink portion of the FDD communication path associated with the third frequency band 526 may need a guard band because they are either transmitting or receiving signals in opposite directions, which may result in significant levels of interference. The uplink guard band 534 and the downlink guard band 536 need not (but can) have the same spectrum bandwidth.

FIGS. 6A-6B are each a diagram depicting time and frequency aspects of a TDD scheme with adjacent FDD schemes, according to other embodiments. FIG. 6A shows a diagram 600 that illustrates a first frequency band 604 associated with a TDD communication path. The diagram 600 also illustrates a second frequency band 602 associated with an uplink portion of an FDD communication path and a third frequency band 606 associated with an uplink portion of an FDD communication path different from the FDD communication path associated with the second frequency band 602.

The first frequency band 604 is associated with a spectrum bandwidth that includes frequencies in the range $f_1$ to $f_4$. The second frequency band 602 is associated with a spectrum bandwidth that includes frequencies in the range $f_0$ to $f_1$. The third frequency bandwidth 606 is associated with a spectrum bandwidth that includes frequencies in the range $f_4$ to $f_5$. The first frequency band 604 is adjacent to the second frequency band 602 (e.g., at $f_1$). The first frequency band 604 is adjacent to the third frequency band 606 (e.g., at $f_4$). The first frequency band 604, the second frequency band 602, and the third frequency band 606 can be mutually exclusive frequency bands. In some embodiments, the first frequency band 604, the second frequency band 602, and the third frequency band 606 are wireless frequency bands.

The first frequency band 604 includes a first portion 610 that has allocated or assigned a spectrum bandwidth including frequencies in the range $f_1$ to $f_4$. The first frequency band 604 includes a second portion 612 that has allocated or assigned a spectrum bandwidth including frequencies in the range $f_2$ to $f_3$. The first portion 610 of the first frequency band 604 is different from the second portion 612 of the first frequency band 604 and overlaps the second portion 612 of the first frequency band 604. The spectrum bandwidth associated with the first portion 610 of the first frequency band 604 is different from the spectrum bandwidth associated with the second portion 612 of the first frequency band 604.

The first portion 610 of the first frequency band 604 is associated with an uplink portion or uplink communication portion of the TDD communication path. The first portion 610 has an uplink time interval or uplink time slot, $T_U$, associated with the interval between time instances $t_1$ and $t_2$. The second portion 612 of the first frequency band 604 is associated with a downlink portion or downlink communication portion of the TDD communication path. The second portion 612 has a downlink time interval or downlink time slot, $T_D$, associated with the interval between time instances $t_0$ and $t_1$.

When the time-bandwidth product associated with the first portion 610 of the first frequency band 604 is substantially the same as the time-bandwidth product associated with the second portion 612 of the first frequency band 604, the TDD communication path associated with the first frequency band 604 operates as a symmetric TDD communication path. When the time-bandwidth product associated with the first portion 610 of the first frequency band 604 is different from the time-bandwidth product associated with the second portion 612 of the first frequency band 604, the TDD communication path associated with the first frequency band 604 operates as an asymmetric TDD communication path. Because the spectrum bandwidth associated with the first portion 610 of the first frequency band 604 is different from the spectrum bandwidth associated with the second portion 612 of the first frequency band 604, when the time intervals associated with the time slots $T_U$ and $T_D$ are the same, the TDD communication path associated with the first frequency band 604 operates as an asymmetric TDD communication path.

FIG. 6A shows the first portion 610 of the first frequency band 604 as being adjacent to the second frequency band 602 and to the third frequency band 606. Because the first portion 610 of the first frequency band 604, the uplink portion of the FDD communication path associated with the second frequency band 602, and the uplink portion of the FDD communication path associated with the second frequency band 606 are either transmitting or receiving signals in a same direction, no guard band may be desirable given that minimal (if any) interference may occur.

The second portion 612 of the first frequency band 604 is shown as being separated from the second frequency band 602 by a downlink guard band 614 and separate from the third frequency band 606 by a downlink guard band 616. The downlink guard bands 614 and 616 may be desirable because the second portion 612 of the first frequency band 604, the uplink portion of the FDD communication path associated with the second frequency band 602, and the uplink portion of the FDD communication path associated with the second frequency band 606 are either transmitting or receiving signals in opposite directions, which may result in significant levels of interference. The downlink guard band 614 and 616 need not (but can) have the same spectrum bandwidth.

FIG. 6B shows a diagram 620 that illustrates a first frequency band 624 associated with a TDD communication path. The diagram 620 also illustrates a second frequency band 622 associated with a downlink portion of an FDD communication path and a third frequency band 626 associated with a downlink portion of an FDD communication path different from the FDD communication path associated with the second frequency band 622.

The first frequency band 624, the second frequency band 622, and the third frequency band 626 are similar to the first frequency band 604, the second frequency band 602, and the third frequency band 606 described above with respect to FIG. 6A. The first frequency band 624 includes a first portion 630 that has allocated or assigned a spectrum bandwidth including frequencies in the range $f_2$ to $f_3$. The first frequency band 624 includes a second portion 632 that has allocated or assigned a spectrum bandwidth including frequencies in the range $f_1$ to $f_4$. The first portion 630 of the first frequency band 624 is different from the second portion 632 of the first frequency band 624 and overlaps the second portion 632 of the first frequency band 624. The spectrum bandwidth associated with the first portion 630 of the first frequency band 624 is different from the spectrum bandwidth associated with the second portion 632 of the first frequency band 624.

The first portion 630 of the first frequency band 624 is associated with an uplink portion of the TDD communication path and has an associated uplink time slot, $T_U$, described above with respect to FIG. 6A. The second portion 632 of the first frequency band 624 is associated with a downlink portion of the TDD communication path and has an associated downlink time slot, $T_D$, also described above with respect to FIG. 6A. The TDD communication path associated with the first frequency 624 can be symmetric or asymmetric based on the time-bandwidth product associated with the first portion 630 of the first frequency band 624 and the time-bandwidth product associated with the second portion 632 of the first frequency band 624. Because the spectrum bandwidth associated with the first portion 630 of the first frequency band 624 is different from the spectrum bandwidth associated with the second portion 632 of the first frequency band 624, when the time intervals associated with the time slots $T_U$ and $T_D$ are the same, the TDD communication path associated with the first frequency band 624 operates as an asymmetric TDD communication path.

FIG. 6B shows the first portion 630 of the first frequency band 624 as being separated from the second frequency band 622 by an uplink guard band 634 and separate from the third frequency band 626 by an uplink guard band 636. The uplink guard bands 634 and 636 need not (but can) have the same spectrum bandwidth. The second portion 632 of the first frequency band 624 is shown as being adjacent to the second frequency band 622 and adjacent to the third frequency band 626.

FIGS. 7A-7B are each a diagram depicting time and frequency aspects of a TDD scheme with adjacent FDD and synchronous TDD schemes, according to embodiments. FIG. 7A shows a diagram 700 that illustrates a first frequency band 704 associated with a TDD communication path. The diagram 700 illustrates a second frequency band 702 associated with a TDD communication path that is synchronized to the TDD communication path in the first frequency band 704. The diagram 700 also illustrates a third frequency band 706 associated with an uplink portion of an FDD communication path.

The first frequency band 704 is associated with a spectrum bandwidth that includes frequencies in the range $f_1$ to $f_3$. The second frequency band 702 is associated with a spectrum bandwidth that includes frequencies in the range $f_0$ to $f_1$. The third frequency bandwidth 706 is associated with a spectrum bandwidth than includes frequencies between frequencies $f_3$ and $f_4$. The first frequency band 704 is adjacent to the second frequency band 702 (e.g., at $f_1$). The first frequency band 704 is also adjacent to the third frequency band 706 (e.g., at $f_3$). The first frequency band 704, the second frequency band 702, and the third frequency band 706 can be mutually exclusive frequency bands. In some embodiments, the first frequency band 704, the second frequency band 702, and the third frequency band 706 are wireless frequency bands.

The first frequency band 704 includes a first portion 710 that has allocated or assigned a spectrum bandwidth including frequencies in the range $f_1$ to $f_3$. The first frequency band 704 includes a second portion 712 that has allocated or assigned a spectrum bandwidth including frequencies in the range $f_1$ to $f_2$. The first portion 710 of the first frequency band 704 is different from the second portion 712 of the first frequency band 704 and overlaps the second portion 712 of the first frequency band 704. The spectrum bandwidth associated with the first portion 710 of the first frequency band 704 is different from the spectrum bandwidth associated with the second portion 712 of the first frequency band 704.

The first portion 710 of the first frequency band 704 is associated with an uplink portion or uplink communication portion of the TDD communication path. The first portion 710 has an uplink time interval or uplink time slot, $T_U$, associated with the interval between time instances $t_1$ and $t_2$. The second portion 712 of the first frequency band 704 is associated with a downlink portion or downlink communication portion of the TDD communication path. The second portion 712 has a downlink time interval or downlink time slot, $T_D$, associated with the interval between time instances $t_0$ and $t_1$.

When the time-bandwidth product associated with the first portion 710 of the first frequency band 704 is substantially the same as the time-bandwidth product associated with the second portion 712 of the first frequency band 704, the TDD communication path associated with the first frequency band 704 operates as a symmetric TDD communication path. When the time-bandwidth product associated with the first portion 710 of the first frequency band 704 is different from the time-bandwidth product associated with the second portion 712 of the first frequency band 704, the TDD communication path associated with the first frequency band 704 operates as an asymmetric TDD communication path.

FIG. 7A shows the first portion 710 of the first frequency band 704 as being adjacent to the second frequency band 702. The synchronized or synchronous TDD communication path in the second frequency band 702 has an uplink portion (not shown) and a downlink portion (not shown) that operate at substantially the same time intervals (i.e., synchronously) as the time intervals $T_U$ and $T_D$ of the first portion 710 and the second portion 712 of the first frequency band 704, respectively. As a result, the first portion 710 of the first frequency band 704 and the synchronous TDD communication path associated with the second frequency band 702 are both either transmitting or receiving signals in a same direction and no guard band may be desirable given that minimal (if any) interference occurs between the first portion 710 of the first frequency band 704 and the second frequency band 702.

The first portion 710 of the first frequency band 704 is also adjacent to the third frequency band 706. The first portion 710 of the first frequency band 704 and the uplink portion of the FDD communication path associated with the third frequency band 706 need no guard band because they are either transmitting or receiving signals in the same direction with minimal or no interference between the frequency bands.

The second portion 712 of the first frequency band 704 is shown as being adjacent to the second frequency band 702 and separate from the third frequency band 706 by a downlink guard band 714. No guard band is needed between the second portion 712 of the first frequency band 704 and the synchronous TDD communication path associated with the second frequency band 702. The downlink guard band 704, however, is needed because the second portion 712 of the first frequency band 704 and the uplink portion of the FDD communication path associated with the third frequency band 706 are transmitting or receiving signals in opposite directions.

FIG. 7B shows a diagram 720 that illustrates a first frequency band 724 associated with a TDD communication path. The diagram 720 also illustrates a second frequency band 722 associated with an uplink portion of an FDD communication path and a third frequency band 726 associated with a synchronous TDD communication path.

The first frequency band 724, the second frequency band 722, and the third frequency band 726 are similar to the first frequency band 704, the second frequency band 702, and the third frequency band 706 described above with respect to FIG. 7A. The first frequency band 724 includes a first portion 730 that has allocated or assigned a spectrum bandwidth including frequencies in the range $f_1$ to $f_3$. The first frequency band 724 includes a second portion 732 that has allocated or assigned a spectrum bandwidth including frequencies in the range $f_2$ to $f_3$. The first portion 730 of the first frequency band 724 is different from the second portion 732 of the first frequency band 724 and overlaps the second portion 732 of the first frequency band 724. The spectrum bandwidth associated with the first portion 730 of the first frequency band 724 is different from the spectrum bandwidth associated with the second portion 732 of the first frequency band 724.

The first portion 730 of the first frequency band 724 is associated with an uplink portion of the TDD communication path and has an associated uplink time slot, $T_U$, described above with respect to FIG. 7A. The second portion 732 of the first frequency band 724 is associated with a downlink portion of the TDD communication path and has an associated downlink time slot, $T_D$, also described above with respect to FIG. 7A. The TDD communication path associated with the first frequency 724 can be symmetric or asymmetric based on the time-bandwidth product associated with the first portion 730 of the first frequency band 724 and the time-bandwidth product associated with the second portion 732 of the first frequency band 724.

FIG. 7B shows the first portion 730 of the first frequency band 724 as being adjacent to the second frequency band 722 and adjacent to the third frequency band 726. The first portion 730 of the first frequency band 724 and the uplink portion of the FDD communication link associated with the second frequency band 722 need no guard band because they are either transmitting or receiving signals in the same direction with minimal (if any) interference. Similarly, the first portion 730 of the first frequency band 724 and the synchronous TDD communication path associated with the third frequency band 726 need no guard band because they are synchronously transmitting or receiving signals in the same direction.

Figure 7C:
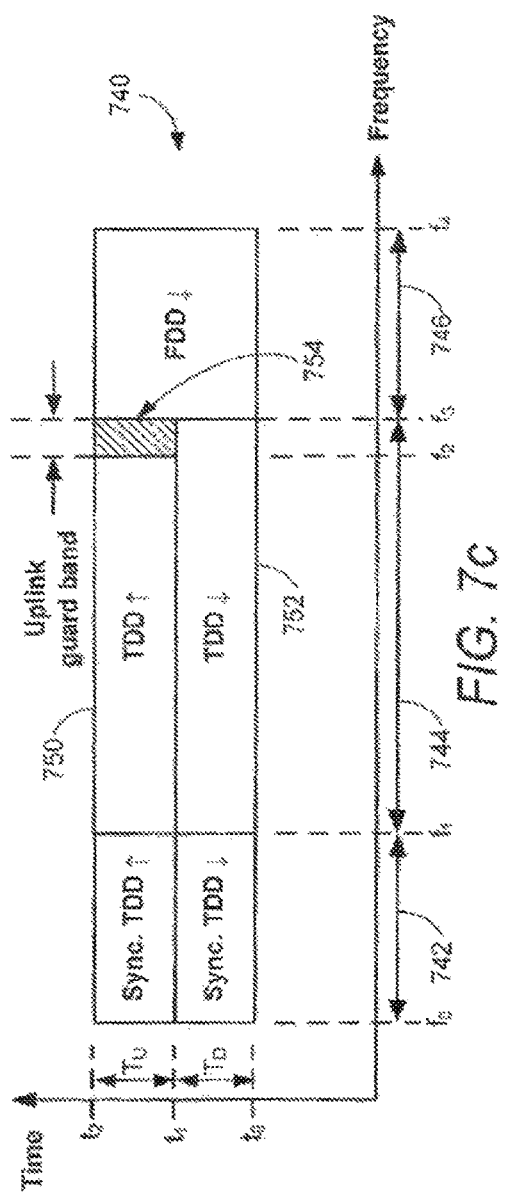
FIGS. 7C-7D are each a diagram depicting time and frequency aspects of a TDD scheme with adjacent FDD and synchronous TDD schemes, according to embodiments.
Figure 7D:
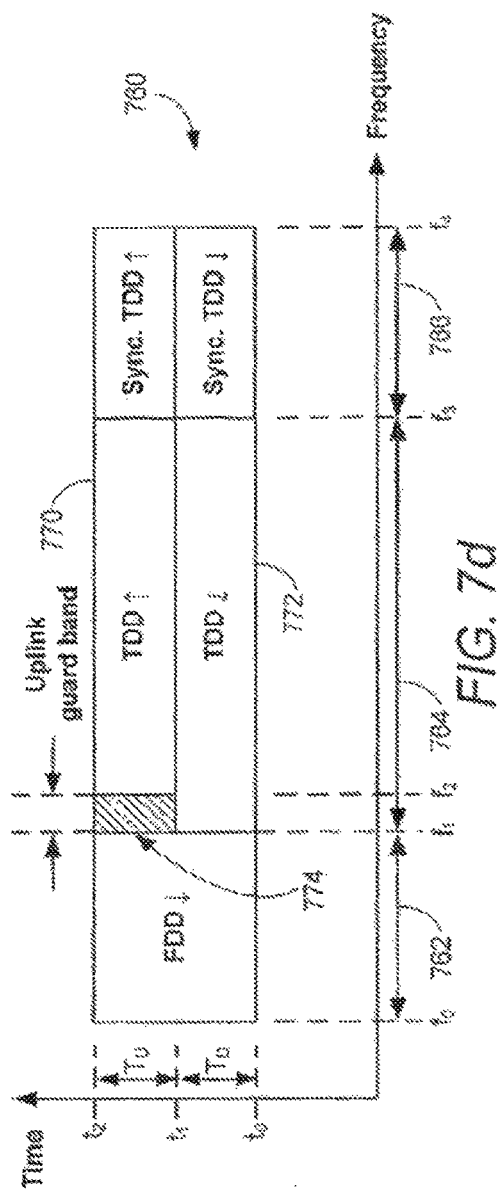

The second portion 732 of the first frequency band 724 is shown as being separated from the second frequency band 722 by a downlink guard band 734 and adjacent to the third frequency band 726. The second portion 732 of the first frequency band 724 and the uplink portion of the FDD communication path associated with the second frequency band 722 may need a guard band because they are either transmitting or receiving signals in opposite directions and are likely to interfere with each other. The second portion 732 of the first frequency band 724 and the synchronous TDD communication path associated with the third frequency band 726 do not need a guard band because they are synchronously transmitting or receiving signals in the same direction FIGS. 7C-7D are each a diagram depicting time and frequency aspects of an asymmetric TDD scheme with adjacent FDD and synchronous TDD schemes, according to other embodiments. FIG. 7C shows a diagram 740 that illustrates a first frequency band 744 associated with a TDD communication path that can be symmetric or asymmetric. The diagram 740 also illustrates a second frequency band 742 associated with a TDD communication path that is synchronized to the TDD communication path in the first frequency band 744. The diagram 740 also illustrates a third frequency band 706 associated with a downlink portion of an FDD communication path.

The first frequency band 744 is associated with a spectrum bandwidth that includes frequencies in the range $f_1$ to $f_3$. The second frequency band 742 is associated with a spectrum bandwidth that includes frequencies in the range $f_0$ to $f_1$. The third frequency bandwidth 746 is associated with a spectrum bandwidth that includes frequencies in the range $f_3$ to $f_4$. The first frequency band 744 is adjacent to the second frequency band 742 (e.g., at $f_1$). The first frequency band 744 is adjacent to the third frequency band 746 (e.g., at $f_3$). The first frequency band 744, the second frequency band 742, and the third frequency band 746 can be mutually exclusive frequency bands. In some embodiments, the first frequency band 744, the second frequency band 742, and the third frequency band 746 are wireless frequency bands.

The first frequency band 744 includes a first portion 750 that has allocated or assigned a spectrum bandwidth including frequencies in the range $f_1$ to $f_2$. The first frequency band 744 includes a second portion 752 that has allocated or assigned a spectrum bandwidth including frequencies between frequencies $f_1$ and $f_3$. The first portion 750 of the first frequency band 744 is different from the second portion 752 of the first frequency band 744 and overlaps the second portion 752 of the first frequency band 744. The spectrum bandwidth associated with the first portion 750 of the first frequency band 744 is different from the spectrum bandwidth associated with the second portion 752 of the first frequency band 744.

The first portion 750 of the first frequency band 744 is associated with an uplink portion or uplink communication portion of the TDD communication path. The first portion 750 has an uplink time interval or uplink time slot, $T_U$, associated with the interval between time instances $t_1$ and $t_2$. The second portion 752 of the first frequency band 744 is associated with a downlink portion or downlink communication portion of the TDD communication path. The second portion 752 has a downlink time interval or downlink time slot, $T_D$, associated with the interval between time instances $t_0$ and $t_1$.

When the time-bandwidth product associated with the first portion 750 of the first frequency band 744 is substantially the same as the time-bandwidth product associated with the second portion 752 of the first frequency band 744, the TDD communication path associated with the first frequency band 744 operates as a symmetric TDD communication path. When the time-bandwidth product associated with the first portion 750 of the first frequency band 744 is different from the time-bandwidth product associated with the second portion 752 of the first frequency band 744, the TDD communication path associated with the first frequency band 744 operates as an asymmetric TDD communication path.

FIG. 7C shows the first portion 750 of the first frequency band 744 as being adjacent to the second frequency band 742. The synchronized or synchronous TDD communication path in the second frequency band 742 has an uplink portion (not shown) and a downlink portion (not shown) that operate at substantially the same time intervals (i.e., synchronously) as the time intervals $T_U$ and $T_D$ of the first portion 750 and the second portion 752 of the first frequency band 744, respectively. As a result, the first portion 750 of the first frequency band 744 and the synchronous TDD communication path associated with the second frequency band 742 are both either transmitting or receiving signals in a same direction and no guard band may be desirable given that minimal (if any) interference occurs between the first portion 750 of the first frequency band 744 and the second frequency band 742.

The first portion 750 of the first frequency band 744 is separate from the third frequency band 746 by an uplink guard band 754 because the first portion 750 of the first frequency band 744 and the FDD communication path associated with third frequency band 746 are transmitting or receiving signals in the opposite directions. The second portion 752 of the first frequency band 744 is shown as being adjacent to the second frequency band 742 and adjacent to the third frequency band 746.

FIG. 7D shows a diagram 760 that illustrates a first frequency band 764 associated with a TDD communication path. The diagram 760 also illustrates a second frequency band 762 associated with a downlink portion of an FDD communication path and a third frequency band 766 associated with a synchronous TDD communication path.

The first frequency band 764, the second frequency band 762, and the third frequency band 766 are similar to the first frequency band 744, the second frequency band 742, and the third frequency band 746 described above with respect to FIG. 7C. The first frequency band 764 includes a first portion 770 that has allocated or assigned a spectrum bandwidth including frequencies in the range $f_2$ to $f_3$. The first frequency band 764 includes a second portion 772 that has allocated or assigned a spectrum bandwidth including frequencies in the range $f_1$ to $f_3$. The first portion 770 of the first frequency band 764 is different from the second portion 772 of the first frequency band 764 and overlaps the second portion 772 of the first frequency band 764. The spectrum bandwidth associated with the first portion 770 of the first frequency band 764 is different from the spectrum bandwidth associated with the second portion 772 of the first frequency band 764.

The first portion 770 of the first frequency band 764 is associated with an uplink portion of the TDD communication path and has an associated uplink time slot, $T_U$, described above with respect to FIG. 7C. The second portion 772 of the first frequency band 764 is associated with a downlink portion of the TDD communication path and has an associated downlink time slot, $T_D$, also described above with respect to FIG. 7C. The TDD communication path associated with the first frequency band 764 can be symmetric or asymmetric based on the time-bandwidth product associated with the first portion 770 of the first frequency band 764 and the time-bandwidth product associated with the second portion 772 of the first frequency band 764.

FIG. 7D shows the first portion 770 of the first frequency band 764 as being separated from the second frequency band 762 by an uplink guard band 774. The first portion 770 of the first frequency band 764 is adjacent to the third frequency band 766. The second portion 772 of the first frequency band 764 is shown as being adjacent to the second frequency band 762 and adjacent to the third frequency band 766.

Figure 8A:
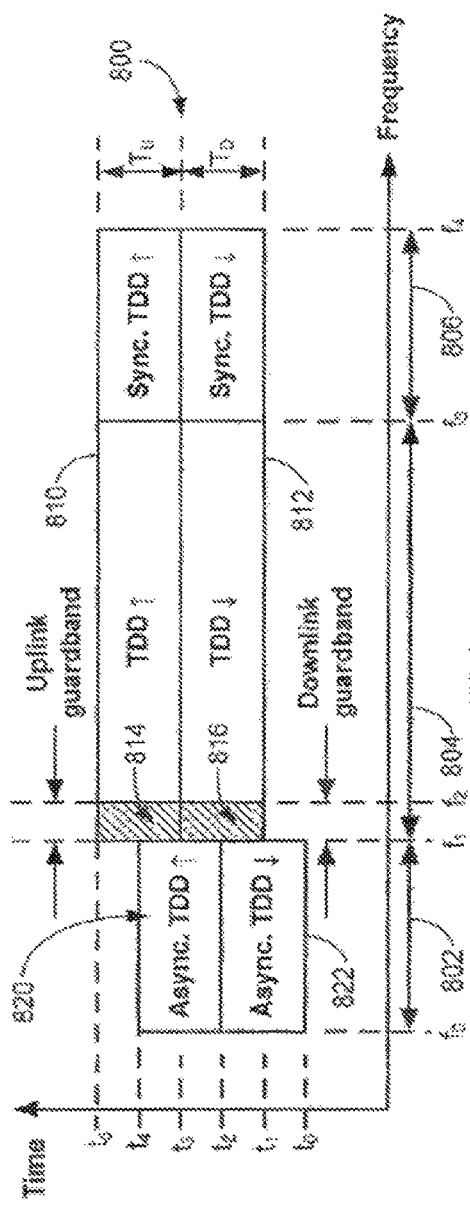
FIGS. 8A-8B are each a diagram depicting time and frequency aspects of a TDD scheme with adjacent synchronous TDD and asynchronous TDD schemes, according to embodiments.
Figure 8B:
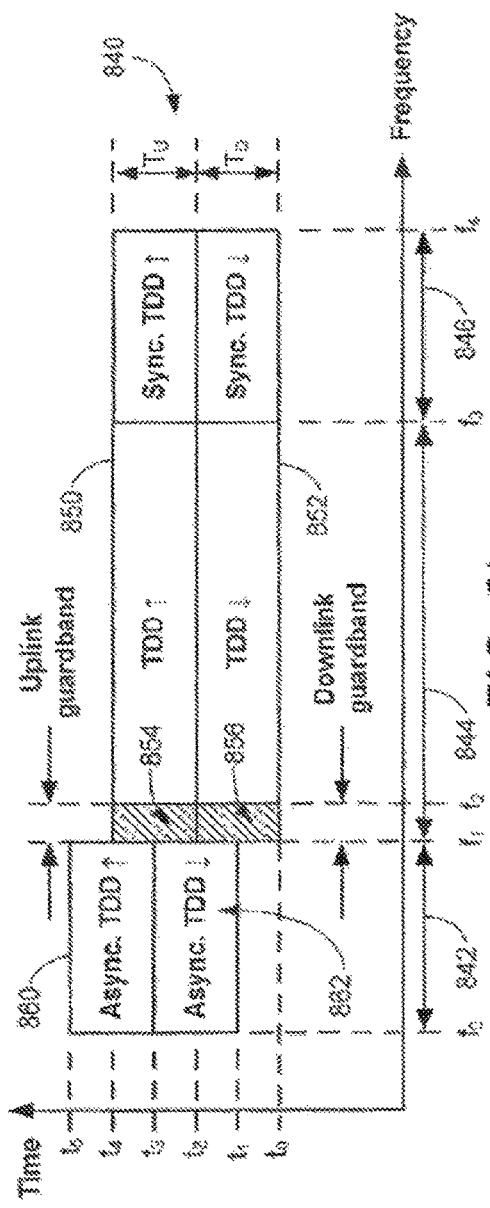

FIGS. 8A-8B are diagrams each depicting time and frequency aspects of a TDD scheme with adjacent synchronous TDD and asynchronous TDD schemes, according to embodiments. FIG. 8A shows a diagram 800 that illustrates a first frequency band 804 associated with a TDD communication path. The diagram 800 illustrates a second frequency band 802 associated with a TDD communication path that is asynchronous with the TDD communication path in the first frequency band 804. The diagram 800 also illustrates a third frequency band 806 associated with a TDD communication path that is synchronous with the TDD communication path in the first frequency band 804.

The first frequency band 804 is associated with a spectrum bandwidth that includes frequencies in the range $f_1$ to $f_3$. The second frequency band 802 is associated with a spectrum bandwidth that includes frequencies in the range $f_0$ to $f_1$. The third frequency bandwidth 806 is associated with a spectrum bandwidth that includes frequencies in the range $f_3$ to $f_4$. The first frequency band 804 is adjacent to the second frequency band 802 (e.g., at $f_1$). The first frequency band 804 is adjacent to the third frequency band 806 (e.g., at $f_3$). The first frequency band 804, the second frequency band 802, and the third frequency band 806 can be mutually exclusive frequency bands. In some embodiments, the first frequency band 804, the second frequency band 802, and the third frequency band 806 are wireless frequency bands.

In this example, the first frequency band 804 includes a first portion 810 that has allocated or assigned a spectrum bandwidth including frequencies in the range $f_2$ to $f_3$. The first frequency band 804 includes a second portion 812, which is also shown as being associated with the spectrum bandwidth that includes frequencies in the range $f_2$ to $f_3$. The spectrum bandwidth associated with the first portion 810 of the first frequency band 804, however, need not be the same as the spectrum bandwidth associated with the second portion 812 of the first frequency band 804.

The first portion 810 of the first frequency band 804 is associated with an uplink portion or uplink communication portion of the TDD communication path. The first portion 810 has an uplink time interval or uplink time slot, $T_U$, associated with the interval between time instances $t_3$ and $t_5$. The second portion 812 of the first frequency band 804 is associated with a downlink portion or downlink communication portion of the TDD communication path. The second portion 812 has a downlink time interval or downlink time slot, $T_D$, associated with the interval between time instances $t_1$ and $t_3$.

When the time-bandwidth product associated with the first portion 810 of the first frequency band 804 is substantially the same as the time-bandwidth product associated with the second portion 812 of the first frequency band 804, the TDD communication path associated with the first frequency band 804 operates as a symmetric TDD communication path. When the time-bandwidth product associated with the first portion 810 of the first frequency band 804 is different from the time-bandwidth product associated with the second portion 812 of the first frequency band 844, the TDD communication path associated with the first frequency band 844 operates as an asymmetric TDD communication path.

FIG. 8A shows the first portion 810 of the first frequency band 804 as being adjacent to the third frequency band 806. The synchronized or synchronous TDD communication path in the third frequency band 806 has an uplink portion (not shown) and a downlink portion (not shown) that operate at substantially the same time intervals (i.e., synchronously) as the time intervals $T_U$ and $T_D$ of the first portion 810 and the second portion 812 of the first frequency band 804, respectively. As a result, the first portion 810 of the first frequency band 804 and the synchronous TDD communication path associated with the third frequency band 806 are both either transmitting or receiving signals in a same direction and no guard band may be desirable.

The first portion 810 of the first frequency band 804 is separate from the second frequency band 802 by an uplink guard band 814 because the first portion 810 of the first frequency band 804 and the asynchronous TDD communication path associated with second frequency band 802 are offset in time. For example, an uplink portion 820 of the asynchronous TDD communication path associated with the second frequency band 802 has an uplink time slot or time interval between time instances $t_2$ and $t_4$. The uplink time slot associated with the uplink portion 820 of the second frequency band 802 is temporally offset or misaligned with the uplink time slot, $T_U$, associated with the first portion 810 of the first frequency band 804. This temporal offset can result in interference between the second frequency band 802 and the first frequency band 804 as at least a portion of the uplink portion 820 of the second frequency band 802 occurs during the second portion 812 of the first frequency band 804.

The second portion 812 of the first frequency band 804 is shown as being adjacent to the third frequency band 806. The second portion 812 of the first frequency band 804 and the synchronous TDD communication path associated with the third frequency band 806 are both either transmitting or receiving signals in a same direction and no guard band may be desirable. The second portion 812 of the first frequency band 804 is separate from the second frequency band 802 by a downlink guard band 816 because the second portion 812 of the first frequency band 804 and the asynchronous TDD communication path associated with second frequency band 802 are offset in time. For example, a downlink portion 822 of the asynchronous TDD communication path associated with the second frequency band 802 has a downlink time slot or time interval between time instances $t_0$ and $t_2$. The downlink time slot associated with the downlink portion 822 of the second frequency band 802 is temporally offset or misaligned with the downlink time slot, $T_D$, associated with the second portion 812 of the first frequency band 804. This temporal offset can result in interference between the second frequency band 802 and the first frequency band 804.

FIG. 8B shows a diagram 840 that illustrates a first frequency band 844 associated with a TDD communication path. The diagram 840 also illustrates a second frequency band 842 associated with an asynchronous TDD communication path and a third frequency band 846 associated with a synchronous TDD communication path.

The first frequency band 844, the second frequency band 842, and the third frequency band 846 are similar to the first frequency band 804, the second frequency band 802, and the third frequency band 806 described above with respect to FIG. 8A. A first portion 850 of the first frequency band 844 is similar to the first portion 810 of the first frequency band 804 described above with respect to FIG. 8A. A second portion 852 of the first frequency band 844 is similar to the second portion 812 of the first frequency band 804 described above with respect to FIG. 8A.

FIG. 8B shows the first portion 850 of the first frequency band 844 and the second portion 852 of the first frequency band as being adjacent to the third frequency band 846. The first portion 850 of the first frequency band 844 is shown separate from the second frequency band 842 by an uplink guard band 854 because the first portion 850 of the first frequency band 844 and the asynchronous TDD communication path associated with second frequency band 842 are offset or misaligned in time (i.e., unsynchronized). For example, an uplink portion 860 of the asynchronous TDD communication path associated with the second frequency band 842 has an uplink time slot between time instances $t_3$ and $t_5$, while the uplink time slot, $T_U$, of the first portion 850 of the first frequency band 844 is associated with time instances $t_2$ and $t_4$.

Similarly, the second portion 852 of the first frequency band 844 is shown separate from the second frequency band 842 by a downlink guard band 856 because the second portion 860 of the first frequency band 844 and the asynchronous TDD communication path associated with second frequency band 842 are offset or misaligned in time. For example, a downlink portion 862 of the asynchronous TDD communication path associated with the second frequency band 842 has a downlink time slot between time instances $t_1$ and $t_3$, while the downlink time slot, $T_D$, of the second portion 852 of the first frequency band 844 is associated with time instances $t_0$ and $t_2$.

Figure 9A:
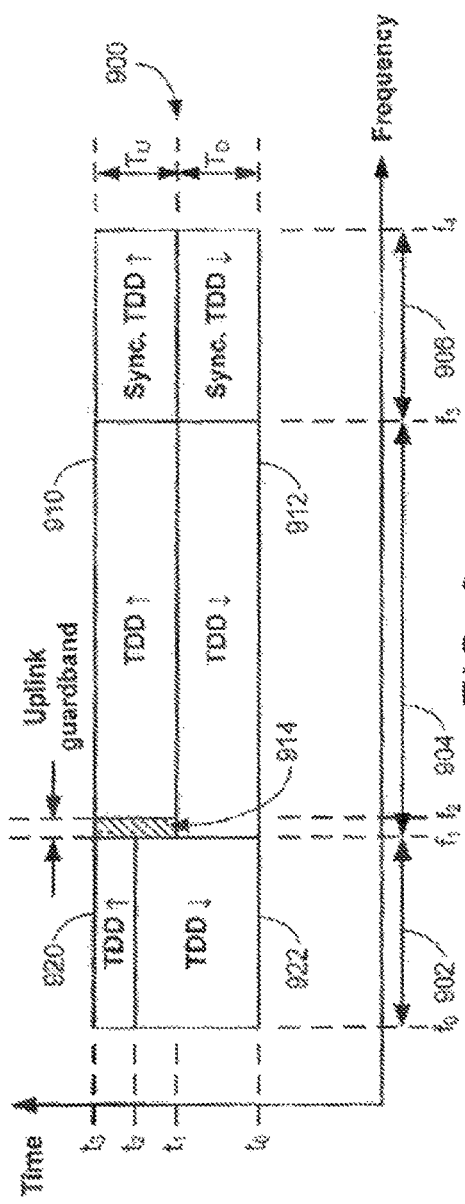
FIGS. 9A-9B are each a diagram depicting time and frequency aspects of a TDD scheme with adjacent synchronous TDD and temporally-asymmetric TDD schemes, according to embodiments.
Figure 9B:
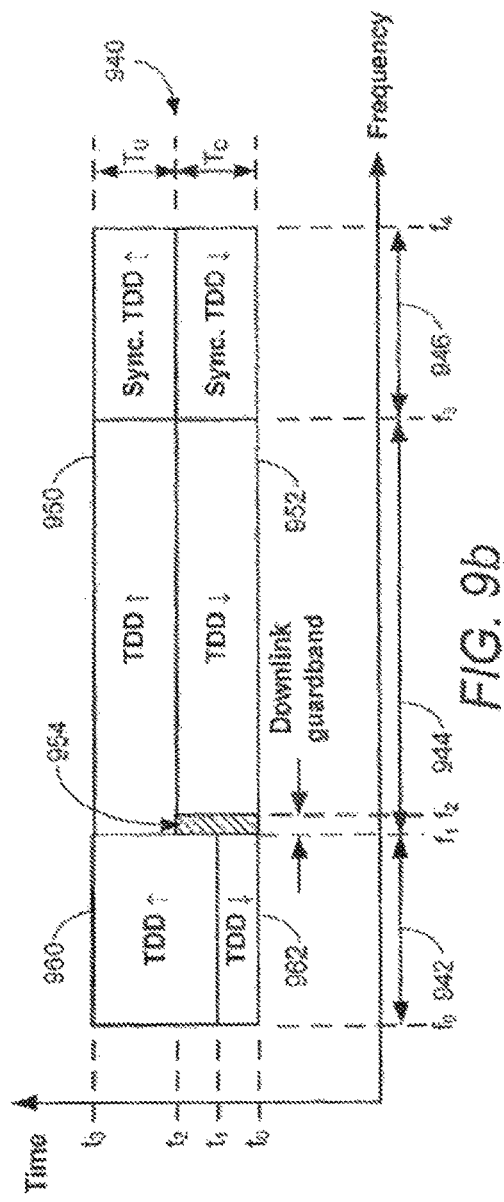

FIGS. 9A-9B are each a diagram depicting time and frequency aspects of a TDD scheme with adjacent synchronous TDD and temporally-asymmetric TDD schemes, according to embodiments. FIG. 9A shows a diagram 900 that illustrates a first frequency band 904 associated with a TDD communication path. The diagram 900 illustrates a second frequency band 902 associated with a temporally-asymmetric TDD communication path. The temporally-asymmetric TDD communication path can refer to a TDD communication path having an uplink time slot duration different from a downlink time slot duration. The diagram 900 further illustrates a third frequency band 906 associated with a TDD communication path that is synchronous with the TDD communication path in the first frequency band 904.

The first frequency band 904 is associated with a spectrum bandwidth that includes frequencies in the range $f_1$ to $f_3$. The second frequency band 902 is associated with a spectrum bandwidth that includes frequencies in the range $f_0$ to $f_1$. The third frequency bandwidth 906 is associated with a spectrum bandwidth that includes frequencies in the range $f_3$ to $f_4$. The first frequency band 904 is adjacent to the second frequency band 902 (e.g., at $f_1$). The first frequency band 904 is adjacent to the third frequency band 906 (e.g., at $f_3$). The first frequency band 904, the second frequency band 902, and the third frequency band 906 can be mutually exclusive frequency bands. In some embodiments, the first frequency band 904, the second frequency band 902, and the third frequency band 906 are wireless frequency bands.

The first frequency band 904 includes a first portion 910 that has allocated or assigned a spectrum bandwidth including frequencies in the range $f_2$ to $f_3$. The first frequency band 904 includes a second portion 912 that has allocated or assigned a spectrum bandwidth including frequencies in the range $f_1$ to $f_3$. The first portion 910 of the first frequency band 904 is different from the second portion 912 of the first frequency band 904. The spectrum bandwidth associated with the first portion 910 of the first frequency band 904 is different from the spectrum bandwidth associated with the second portion 912 of the first frequency band 904.

The first portion 910 of the first frequency band 904 is associated with an uplink portion of the TDD communication path. The first portion 910 has an uplink time slot, $T_U$, associated with the interval between time instances $t_1$ and $t_3$. The second portion 912 of the first frequency band 904 is associated with a downlink portion of the TDD communication path. The second portion 912 has a downlink time slot, $T_D$, associated with the interval between time instances $t_0$ and $t_1$.

The TDD communication path associated with the first frequency band 904 is symmetric when a time-bandwidth product associated with the first portion 910 of the first frequency band 904 is substantially the same as a time-bandwidth product associated with the second portion 912 of the first frequency band 904. The TDD communication path associated with the first frequency band 904 is asymmetric when the time-bandwidth product associated with the first portion 910 of the first frequency band 904 is different from the time-bandwidth product associated with the second portion 912 of the first frequency band 904.

FIG. 9A shows the first portion 910 of the first frequency band 904 as being adjacent to the third frequency band 906. The synchronous TDD communication path in the third frequency band 906 has an uplink portion (not shown) and a downlink portion (not shown) that operate at substantially the same time intervals as the time intervals $T_U$ and $T_D$ of the first portion 910 and the second portion 912 of the first frequency band 904, respectively.

The first portion 910 of the first frequency band 904 is separate from the second frequency band 902 by an uplink guard band 914 because the first portion 910 of the first frequency band 904 and the temporally-asymmetric TDD communication path associated with second frequency band 902 are offset in time. For example, an uplink portion 920 of the temporally-asymmetric TDD communication path associated with the second frequency band 802 has an uplink time slot or time interval between time instances $t_2$ and $t_3$. The uplink time slot associated with the uplink portion 920 of the second frequency band 902 is temporally offset or misaligned with the uplink time slot, $T_U$, associated with the first portion 910 of the first frequency band 904. This temporal offset can result in interference between the second frequency band 902 and the first frequency band 904.

The second portion 912 of the first frequency band 904 is shown as being adjacent to the second frequency band 902 and adjacent to the third frequency band 906. The second portion 912 of the first frequency band 904 and the synchronous TDD communication path associated with the third frequency band 906 are both either transmitting or receiving signals in a same direction and no guard band may be desirable. The second portion 912 of the first frequency band 904 and the second frequency band 902 need no guard band because the second portion 912 of the first frequency band 904 and the temporally-asymmetric TDD communication path associated with second frequency band 902 are transmitting or receiving signals at the same time. For example, a downlink portion 922 of the temporally-asymmetric TDD communication path associated with the second frequency band 902 has a downlink time slot between time instances $t_0$ and $t_2$. As a result, the downlink time slot associated with the downlink portion 922 of the second frequency band 902 and the downlink time slot, $T_D$, associated with the second portion 912 of the first frequency band 904 are common over the time instances $t_0$ and $t_1$ associated with the downlink time slot, $T_D$, and no guard band may be desirable.

FIG. 9B shows a diagram 940 that illustrates a first frequency band 944 associated with a TDD communication path. The diagram 940 also illustrates a second frequency band 942 associated with a temporally-asymmetric TDD communication path and a third frequency band 946 associated with a synchronous TDD communication path.

The first frequency band 944, the second frequency band 942, and the third frequency band 946 are similar to the first frequency band 904, the second frequency band 902, and the third frequency band 906 described above with respect to FIG. 9A. The first frequency band 944 has a first portion 950 associated with an uplink portion of the TDD communication path. The first frequency band 944 has a second portion 952 associated with a downlink portion of the TDD communication path. The second frequency band 942 has a first portion 960 associated with an uplink portion of the temporally-asymmetric TDD communication path. The second frequency band 942 has a second portion 962 associated with a downlink portion of the temporally-asymmetric TDD communication path.

The first portion 950 of the first frequency band 944 is shown as being adjacent to the third frequency band 946 and adjacent to the second frequency band 942. The second portion 952 of the first frequency band 944 is shown as being adjacent to the third frequency band 946 and separate from the second frequency band 942 by a downlink guard band 954. The downlink guard band 954 may be desirable because the uplink portion 960 of the second frequency band 942 overlaps in time with the second portion 952 of the first frequency band 944 that is associated with the downlink portion of the TDD communication path.

FIGS. 10A-10B are each a diagram depicting time and frequency aspects of a TDD scheme with adjacent temporally-asymmetric TDD schemes, according to an embodiment. FIG. 10A shows a diagram 1000 that illustrates a first frequency band 1004 associated with a TDD communication path. The diagram 1000 also illustrates a second frequency band 1002 associated with a temporally-asymmetric TDD communication path. In this example, the temporally-asymmetric TDD communication path associated with the second frequency band 1002 has an uplink time slot duration that is shorter than a downlink time slot duration. For example, the uplink time slot is between time instances $t_2$ and $t_3$ and the downlink time slot is between time instances $t_0$ and $t_2$. The diagram 1000 further illustrates a third frequency band 1006 associated with a temporally-asymmetric TDD communication path different from that of the second frequency band 1002. In this example, the temporally-asymmetric TDD communication path associated with the third frequency band 1006 also has the same uplink time slot duration and the same downlink time slot duration as the temporally-asymmetric TDD communication path associated with the second frequency band 1002.

The first frequency band 1004 includes a first portion 1010 and a second portion 1012. A spectrum bandwidth associated with the first portion 1010 of the first frequency band 1004 is smaller than a spectrum bandwidth associated with the second portion 1012 of the first frequency band 1004. The first portion 1010 of the first frequency band 1004 is associated with an uplink portion of the TDD communication path. The second portion 1012 of the first frequency band 1004 is associated with a downlink portion of the TDD communication path. The second frequency band 1002 includes an uplink portion 1020 and a downlink portion 1022 associated with the temporally-asymmetric TDD communication path. The third frequency band 1006 includes an uplink portion 1030 and a downlink portion 1032 associated with the temporally-asymmetric TDD communication path.

FIG. 10A shows the first portion 1010 of the first frequency band 1004 as separate from the second frequency band 1002 by an uplink guard band 1014 and separate from the third frequency band 1006 by an uplink guard band 1016. The uplink guard bands 1014 and 1016 may be desirable because the downlink portion 1022 of the second frequency band 1002 and the downlink portion 1032 of the third frequency band 1006 temporally overlap the first portion 1010 of the first frequency band 1004 that is associated with the uplink portion of the TDD communication path such that interference may occur between the bands.

Similarly, the second portion 1012 of the first frequency band 1004 is shown as adjacent to the second frequency band 1002 and adjacent to the third frequency band 1006. In this embodiment, guard bands need not be used because the second portion 1012 of the first frequency band 1004 occurs during a time interval (e.g., between $t_0$ and $t_1$) that coincides with a time interval (e.g., between $t_0$ and $t_2$) associated with the downlink portion 1022 of the second frequency band 1002 and also associated with the downlink portion 1032 of the third frequency band 1006.

FIG. 10B shows a diagram 1040 that illustrates a first frequency band 1044 associated with a TDD communication path. The diagram 1040 also illustrates a second frequency band 1042 associated with a temporally-asymmetric TDD communication path and a third frequency band 1046 associated with a different temporally-asymmetric TDD communication path. In this example, the temporally-asymmetric TDD communication path associated with the second frequency band 1042 and the temporally-asymmetric TDD communication path associated with the third frequency band 1046 each has an uplink time slot duration that is longer than a downlink time slot duration.

The first frequency band 1044, the second frequency band 1042, and the third frequency band 1046 are similar to the first frequency band 1004, the second frequency band 1002, and the third frequency band 1006 described above with respect to FIG. 10A. The first frequency band 1044 has a first portion 1050 associated with an uplink portion of the TDD communication path. The first frequency band 1044 has a second portion 1052 associated with a downlink portion of the TDD communication path. The second frequency band 1042 has a first portion 1060 associated with an uplink portion of the temporally-asymmetric TDD communication path. The second frequency band 1042 has a second portion 1062 associated with a downlink portion of the temporally-asymmetric TDD communication path. The third frequency band 1046 has a first portion 1070 associated with an uplink portion of the temporally-asymmetric TDD communication path. The third frequency band 1046 has a second portion 1072 associated with a downlink portion of the temporally-asymmetric TDD communication path.

The first portion 1050 of the first frequency band 1044 is shown as being adjacent to the third frequency band 1046 and adjacent to the second frequency band 1042. The second portion 1052 of the first frequency band 1044 is shown as being separated from to the third frequency band 1046 by a downlink guard band 1056 and separate from the second frequency band 1042 by a downlink guard band 1054. The downlink guard bands 1054 and 1056 may be desirable because the uplink portion 1060 of the second frequency band 1042 and the uplink portion 1070 of the third frequency band 1046 each overlaps in time (e.g., between $t_1$ and $t_2$) with the second portion 1052 of the first frequency band 1044 that is associated with the downlink portion of the TDD communication path.

FIGS. 11A-11B are each a diagram depicting the time and frequency aspects of a TDD scheme with adjacent temporally-asymmetric TDD schemes, according embodiments. FIG. 11A shows a diagram 1100 that illustrates a first frequency band 1104 associated with a TDD communication path. The TDD communication path can be symmetric or asymmetric. The diagram 1100 also illustrates a second frequency band 1102 associated with a temporally-asymmetric TDD communication path. In this example, the temporally-asymmetric TDD communication path associated with the second frequency band 1002 has an uplink time slot duration (e.g., between $t_3$ and $t_4$) that is shorter than a downlink time slot duration (e.g., between $t_0$ and $t_3$). The diagram 1100 further illustrates a third frequency band 1106 associated with a temporally-asymmetric TDD communication path. In this example, the temporally-asymmetric TDD communication path associated with the third frequency band 1106 has an uplink time slot duration (e.g., between $t_1$ and $t_4$) that is longer than a downlink time slot duration (e.g., between $t_0$ and $t_1$).

The first frequency band 1104 includes a first portion 1110 and a second portion 1112. A spectrum bandwidth associated with the first portion 1110 of the first frequency band 1104 can be the same (or different) than a spectrum bandwidth associated with the second portion 1112 of the first frequency band 1104. The first portion 1110 of the first frequency band 1104 is associated with an uplink portion of the TDD communication path. The second portion 1112 of the first frequency band 1104 is associated with a downlink portion of the TDD communication path. The second frequency band 1102 includes an uplink portion 1120 and a downlink portion 1122 of the temporally-asymmetric TDD communication path. The third frequency band 1106 includes an uplink portion 1130 and a downlink portion 1132 of the temporally-asymmetric TDD communication path.S FIG. 11A shows the first portion 1110 of the first frequency band 1104 as separate from the second frequency band 1102 by an uplink guard band 1114 and adjacent to the third frequency band 1106. The uplink guard band 1114 may be desirable because the downlink portion 1122 of the second frequency band 1102 temporally overlaps the first portion 1110 of the first frequency band 1104 that is associated with the uplink portion of the TDD communication path. Without the uplink guard band 1114, this temporal overlap can cause interference between communication schemes operating in the first frequency band 1104 and the second frequency band 1102.

Similarly, the second portion 1112 of the first frequency band 1104 is shown as adjacent to the second frequency band 1102 and separate from the third frequency band 1106 by a downlink guard band 1116. The downlink guard band 1116 may be desirable because the uplink portion 1130 of the third frequency band 1106 temporally overlaps the second portion 1112 of the first frequency band 1104 that is associated with the downlink portion of the TDD communication path. Without the downlink guard band 1116, this temporal overlap can cause interference between communication schemes operating in the first frequency band 1104 and in the third frequency band 1106.

FIG. 11B shows a diagram 1140 that illustrates a first frequency band 1144 associated with a TDD communication path. The diagram 1140 also illustrates a second frequency band 1142 associated with a temporally-asymmetric TDD communication path and a third frequency band 1146 associated with a different temporally-asymmetric TDD communication path. In this example, the temporally-asymmetric TDD communication path associated with the second frequency band 1142 has an uplink time slot duration (e.g., between $t_1$ and $t_4$) that is longer than a downlink time slot duration (e.g., between $t_0$ and $t_1$). The temporally-asymmetric TDD communication path associated with the third frequency band 1146 has an uplink time slot duration (e.g., between $t_3$ and $t_4$) that is shorter than a downlink time slot duration (e.g., between $t_0$ and $t_3$).

The first frequency band 1144, the second frequency band 1142, and the third frequency band 1146 are similar to the first frequency band 1104, the second frequency band 1102, and the third frequency band 1106 described above with respect to FIG. 11A. The first frequency band 1144 has a first portion 1150 associated with an uplink portion of the TDD communication path. The first frequency band 1144 has a second portion 1152 associated with a downlink portion of the TDD communication path. The second frequency band 1142 has a first portion 1160 associated with an uplink portion of the temporally-asymmetric TDD communication path. The second frequency band 1142 has a second portion 1162 associated with a downlink portion of the temporally-asymmetric TDD communication path. The third frequency band 1146 has a first portion 1170 associated with an uplink portion of the temporally-asymmetric TDD communication path. The third frequency band 1146 has a second portion 1172 associated with a downlink portion of the temporally-asymmetric TDD communication path.

The first portion 1150 of the first frequency band 1144 is shown as being adjacent to the second frequency band 1142 and separate from the third frequency band 1146 by an uplink guard band 1156. The uplink guard band 1156 may be desirable because the downlink portion 1172 of the third frequency band 1146 overlaps in time with the first portion 1150 of the first frequency band 1144 that is associated with the uplink portion of the TDD communication path. The second portion 1152 of the first frequency band 1144 is shown as being separated from to the second frequency band 1142 by a downlink guard band 1154 and adjacent to the third frequency band 1146. The downlink guard band 1154 may be desirable because the uplink portion 1160 of the second frequency band 1142 overlaps in time with the second portion 1152 of the first frequency band 1144 that is associated with the downlink portion of the TDD communication path.

FIGS. 12A-12B are each a diagram depicting time and frequency aspects of a TDD scheme with adjacent FDD and broadcast schemes, according to embodiments. FIG. 12A shows a diagram 1200 that illustrates a first frequency band 1204 associated with a TDD communication path. The TDD communication path can be symmetric or asymmetric. The diagram 1200 also illustrates a second frequency band 1202 associated with a wireless broadcast. The diagram 1200 further illustrates a third frequency band 1206 associated with a downlink portion of an FDD communication path.

The first frequency band 1204 includes a first portion 1210 and a second portion 1212. A spectrum bandwidth associated with the first portion 1210 of the first frequency band 1204 is different from a spectrum bandwidth associated with the second portion 1212 of the first frequency band 1204. The first portion 1210 of the first frequency band 1204 is associated with an uplink portion of the TDD communication path. The second portion 1212 of the first frequency band 1204 is associated with a downlink portion of the TDD communication path.

FIG. 12A shows the first portion 1210 of the first frequency band 1204 as separate from the second frequency band 1202 by an uplink guard band 1214 and separate from the third frequency band 1206 by an uplink guard band 1216. The uplink guard band 1214 may be desirable because the wireless broadcast associated with the second frequency band 1202 could interfere with the first portion 1210 of the first frequency band 1204 associated with the uplink portion of the TDD communication path. Similarly, the uplink guard band 1216 may be desirable because the downlink portion of the FDD communication path associated with the second frequency band 1202 could interfere with the first portion 1210 of the first frequency band 1204 associated with the uplink portion of the TDD communication path. The second portion 1212 of the first frequency band 1204 is shown as being adjacent to both the second frequency band 1204 and adjacent to the third frequency band 1206.

FIG. 12B shows a diagram 1220 that illustrates a first frequency band 1224 associated with a TDD communication path. The diagram 1220 also illustrates a second frequency band 1222 associated with a wireless broadcast and a third frequency band 1226 associated with an uplink portion of an FDD communication path.

The first frequency band 1224, the second frequency band 1222, and the third frequency band 1226 are similar to the first frequency band 1204, the second frequency band 1202, and the third frequency band 1206 described above with respect to FIG. 12A. The first frequency band 1224 has a first portion 1230 associated with an uplink portion of the TDD communication path. The first frequency band 1224 has a second portion 1232 associated with a downlink portion of the TDD communication path.

The first portion 1230 of the first frequency band 1224 is shown as being separated from the second frequency band 1222 by an uplink guard band 1234 and adjacent to the third frequency band 1226. The uplink guard band 1234 may be desirable because the wireless broadcast associated with the second frequency band could would interfere with the first portion 1230 of the first frequency band 1224 associated with the uplink portion of the TDD communication path. The second portion 1232 of the first frequency band 1224 is shown as being adjacent to the second frequency band 1222 and separate from the third frequency band 1226 by a downlink guard band 1236. The downlink guard band 1236 may be desirable because the uplink portion of the FDD communication path associated with the third frequency band 1226 could interfere with the second portion 1232 of the first frequency band 1224 that is associated with the downlink portion of the TDD communication path.

Figure 13:
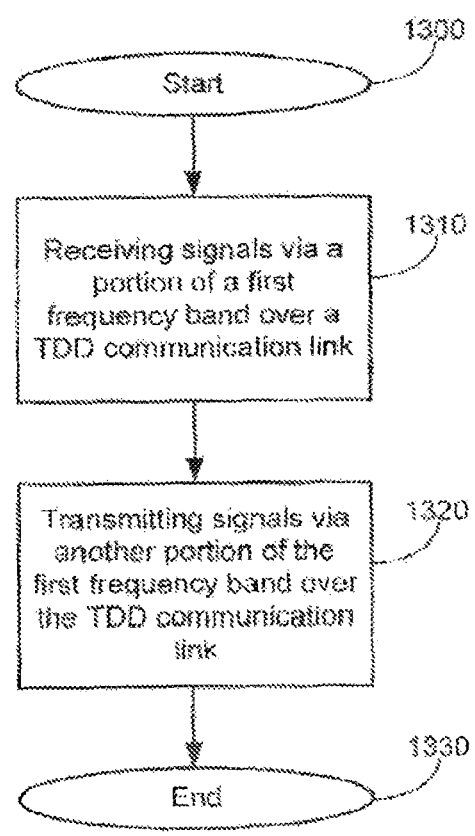
FIGS. 13-15 are flow charts illustrating a method for a TDD scheme, according to embodiments.

FIG. 13 is a flow chart illustrating a method for using an asymmetric TDD scheme, according to an embodiment. At 1310, after 1300, receiving signals via a portion of a first frequency band over an asymmetric TDD communication path associated with the first frequency band. The first frequency band and the associated asymmetric TDD communication path can be based on one or more embodiments described herein with respect to FIGS. 3-12B. At 1320, transmitting signals via a different portion of the first frequency band over the asymmetric TDD communication path associated with the first frequency band. After 1320, the process proceeds to 1330.

Figure 14:
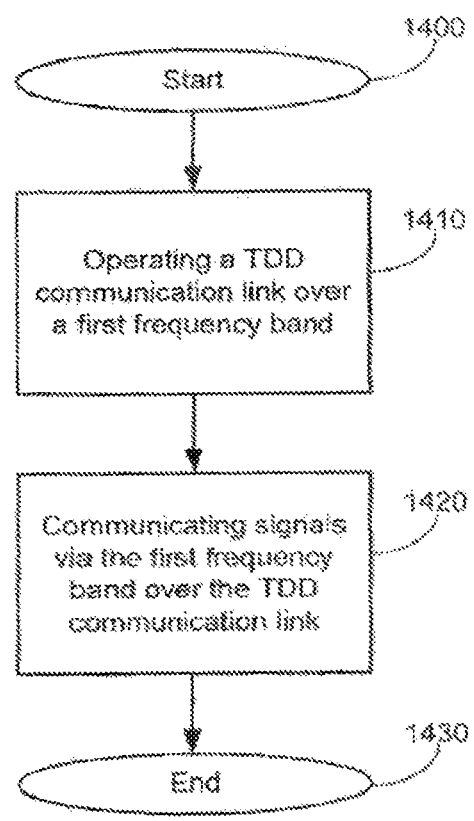

FIG. 14 is a flow chart illustrating a method for using an asymmetric TDD scheme, according to another embodiment. At 1410, after 1400, an asymmetric TDD communication path is operated over a first frequency band. The first frequency band and the associated asymmetric TDD communication path can be based on one or more embodiments described herein with respect to FIGS. 3-12B. At 1420, communicating signals via the first frequency band over the asymmetric TDD communication path associated with the first frequency band. After 1420, the process proceeds to 1430.

Figure 15:
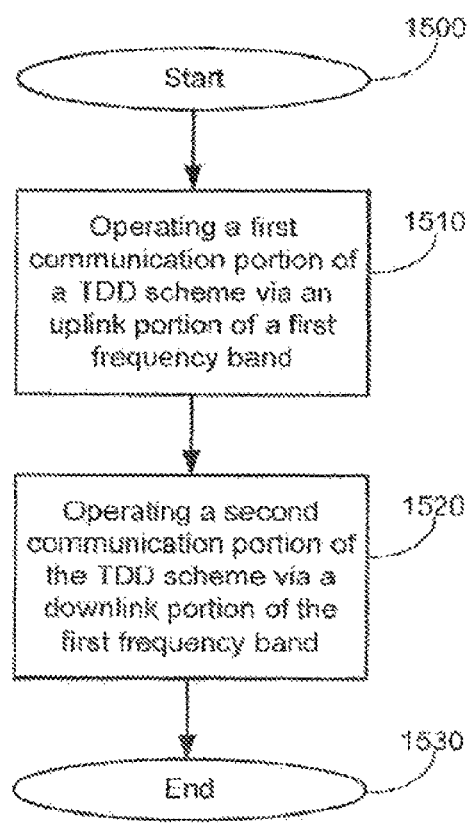

FIG. 15 is a flow chart illustrating a method for using an asymmetric TDD scheme, according to yet another embodiment. At 1510, after 1500, operating a first communication portion of an asymmetric TDD communication path via an uplink portion of a first frequency band. The first frequency band and the associated asymmetric TDD communication path can be based on one or more embodiments described herein with respect to FIGS. 3-12B. At 1520, operating a second communication portion of the asymmetric TDD communication path via a downlink portion of the first frequency band. After 1520, the process proceeds to 1530.

In one or more embodiments, the communication methods associated with asymmetric TDD communication paths described above with respect to FIGS. 3-12B can be implemented in flexible-use spectrum. In one or more embodiments, the communication methods associated with asymmetric TDD communication paths described above with respect to FIGS. 3-12B can be implemented in spectrum having a dedicated use.

CONCLUSION

While various embodiments of the invention have been described above, it should be understood that they have been presented by way of example only, and not limitation. For example, the methods described herein can include various combinations and/or sub-combinations of the components and/or features of the different embodiments described. Although described with reference to use with flexible-use spectrum for satellite, terrestrial, and/or hybrid wireless communication systems, it should be understood that the asymmetric TDD methods described herein can be used with frequency bands dedicated for particular use and for use with certain wireless communication systems. Moreover, the asymmetric TDD methods described herein can be used with frequency bands in wired communication systems.

The invention claimed is:

1. A method, comprising:
    transmitting a first signal over a time division duplex (TDD) communication path via a first portion of a first frequency band;
    receiving a second signal over the TDD communication path via a second portion of the first frequency band;
        wherein the first portion uses a smaller spectrum bandwidth than the second portion;
        wherein the first frequency hand is adjacent to a second frequency band;
        wherein the second frequency band includes a second TDD communication path having a third portion and a fourth portion;
            wherein a first guard band separates the first portion from each of the third portion and, for a limited time segment, the fourth portion;

wherein the first frequency band is adjacent to a third frequency band; and
wherein the third frequency band includes a third TDD communication path having a fifth portion and a sixth portion.

2. The method of claim 1,
wherein the first frequency band is mutually exclusive of and arises in-between the second frequency band and the third frequency band.

3. The method of claim 1,
wherein the second TDD communication path is temporally-asymmetric.

4. The method of claim 1,
wherein the third TDD communication path is temporally-asymmetric.

5. The method of claim 4,
wherein a second guard-band separates the first portion from at least one of the fifth portion and the sixth portion.

6. The method of claim 1, comprising at least one of
transmitting a third signal over the third portion and
receiving a fourth signal over the fourth portion.

7. The method of claim 6,
wherein the transmitting of the first signal begins before the transmitting of the third signal begins and while the fourth signal is being received.

8. The method of claim 6,
wherein the receiving of the fourth signal occurs during a first period ranging from an initial time to a second time;
wherein the transmitting of the first signal occurs during a second period ranging from a first time to a third time; and
wherein the first time arises after the initial time and before the second time, and the third time arises after the second time.

9. The method of claim 8, comprising at least one of
transmitting a fifth signal over the first portion and
receiving a sixth signal over the sixth portion.

10. The method of claim 9,
wherein the transmitting of the third signal and the transmitting of the fifth signal occur during a third period ranging from a second time to a third time;
wherein the first period arises before the third period; and
wherein, the receiving of the fourth signal occurs during the first period.

11. The method of claim 6, comprising:
receiving a sixth signal over the sixth portion; and
wherein the transmitting of the first signal begins while the sixth signal is being received.

12. The method of claim 1,
wherein the second portion is immediately adjacent to the fourth portion.

13. The method of claim 12,
wherein the second, portion is immediately adjacent to the sixth portion.

14. The method of claim 1,
wherein the first portion uses a smaller frequency range than the second portion.

15. A method, comprising:
sending a first signal over a first time division duplex (TDD) communication path via a first portion of a first frequency band;
receiving a second signal over the first TDD communication path via a second portion of the first frequency band different;
wherein the first portion of the first frequency band uses a larger spectrum bandwidth than the second portion of the first frequency band;
wherein the first frequency band is adjacent to and mutually exclusive of a second frequency band;
wherein the second frequency band includes a second TDD communication path that comprises a first temporally-asymmetric path including a third portion and a fourth portion;
wherein a first guard hand separates the first portion from each of the fourth portion and, for a limited time segment, the third portion;
wherein the first frequency band is adjacent to and mutually exclusive of a third frequency band;
wherein the third frequency band includes a third TDD communication path, that comprises a second temporally-asymmetric path including a fifth portion and a sixth portion; and
wherein a second guard band separates the first portion from each of the sixth portion and, for a limited time segment, the fit portion.

16. A method comprising,
sending a first signal over a first time division duplex (TDD) communication path via a first portion of a first frequency band;
receiving a second signal over the first TDD communication path via a second portion of the first frequency band different from the first portion of the first frequency band;
wherein the first frequency band is adjacent to a second frequency band and a third frequency band;
wherein, the first frequency band is different from the second frequency band and the third frequency band;
wherein the second frequency band includes a second TDD communication path;
wherein the second TDD communication path comprises a first temporally-asymmetric path including a third portion and a fourth portion;
wherein the third frequency band includes a third TDD communication path;
wherein the third TDD communication path comprises a second temporally-asymmetric path including a fifth portion and a sixth portion; and
wherein the third portion of the first temporally-asymmetric path is synchronous with the sixth portion of the second temporally-asymmetric path;
wherein a first guard band separates the first portion from:
each of the third portion and, for a limited time segment, the fourth portion; or
each of the fourth portion and, for a limited time segment, the third portion.

17. The method of claim 16,
wherein the first portion of the first frequency band uses a smaller spectrum bandwidth than the second portion of the first frequency band.

18. The method of claim 16,
wherein the first portion of the first frequency band uses a larger spectrum bandwidth than the second portion of the first frequency band.

* * * * *

UNITED STATES PATENT AND TRADEMARK OFFICE
CERTIFICATE OF CORRECTION

PATENT NO.        : 10,263,756 B2
APPLICATION NO.   : 15/641289
DATED             : April 16, 2019
INVENTOR(S)       : Mariam Sorond et al.

Page 1 of 1

It is certified that error appears in the above-identified patent and that said Letters Patent is hereby corrected as shown below:

In the Claims

In Column 30, Line 14, delete "fit" and replace with -- fifth --.

Signed and Sealed this
Eighteenth Day of June, 2019

Andrei Iancu
*Director of the United States Patent and Trademark Office*